(12) United States Patent
Aubin-Marchand et al.

(10) Patent No.: US 12,441,418 B2
(45) Date of Patent: Oct. 14, 2025

(54) DEFORMABLE WHEELS AND TRACK SYSTEMS COMPRISING SAME

(71) Applicant: SOUCY INTERNATIONAL INC., Drummondville (CA)

(72) Inventors: Jeremie Aubin-Marchand, St-Hugues (CA); Etienne Leblanc, Becancour (CA); Jonathan Frenette-Marcoux, Drummondville (CA); Michael Charrette, St-Felix de Kingsey (CA); Normand Roy, St-Hugues (CA); Manuel Lemelin, Saint-Hyacinthe (CA); Vincent Morin, Saint-Hyacinthe (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 491 days.

(21) Appl. No.: 17/894,698

(22) Filed: Aug. 24, 2022

(65) Prior Publication Data
US 2023/0060368 A1  Mar. 2, 2023

Related U.S. Application Data

(60) Provisional application No. 63/236,790, filed on Aug. 25, 2021.

(51) Int. Cl.
| | |
|---|---|
| *B62D 55/096* | (2006.01) |
| *B60B 9/10* | (2006.01) |
| *B62D 55/108* | (2006.01) |
| *B62D 55/12* | (2006.01) |

(52) U.S. Cl.
CPC .......... *B62D 55/0963* (2013.01); *B60B 9/10* (2013.01); *B62D 55/108* (2013.01); *B62D 55/12* (2013.01)

(58) Field of Classification Search
CPC .. B62D 55/0963; B62D 55/12; B62D 55/108; B62D 55/104; B62D 55/0655; B62D 55/08; B62D 55/116; B62D 55/096; B60B 25/02; B60B 9/00; B60B 9/26; B60B 9/14; B60B 9/10; B60B 9/12; B60B 15/22; B60B 15/20; B60B 15/18; B60C 7/10
See application file for complete search history.

(56) References Cited

U.S. PATENT DOCUMENTS

| | | | |
|---|---|---|---|
| 1,615,349 A | 1/1927 | Steude | |
| 4,759,638 A * | 7/1988 | McLaughlin | ........... B60B 15/22 301/43 |
| 10,266,215 B2 | 4/2019 | Jean et al. | |
| 10,525,773 B2 | 1/2020 | Korus et al. | |
| 2012/0200149 A1* | 8/2012 | Rudakevych | ........ B62D 55/075 301/62 |
| 2017/0036714 A1* | 2/2017 | Lunkenbein | ........... B62D 55/14 |

FOREIGN PATENT DOCUMENTS

DE  202018005552 U1 * 3/2019

* cited by examiner

*Primary Examiner* — S. Joseph Morano
*Assistant Examiner* — Alex Palmer
(74) *Attorney, Agent, or Firm* — BCF LLP

(57) ABSTRACT

A deformable wheel is disclosed. The deformable wheel includes a hub, at least one resilient member connected to the hub, and a plurality of circumferentially positioned rim portions connected to the at least one resilient member, where each one of the plurality of rim portions is moveable relative to the hub about the at least one resilient member. A track system including the deformable wheel is also disclosed.

17 Claims, 16 Drawing Sheets

DEFORMABLE WHEELS AND TRACK SYSTEMS COMPRISING SAME

CROSS-REFERENCE TO RELATED APPLICATION

The present application claims priority to U.S. Provisional Patent Application No. 63/236,790, filed Aug. 25, 2021, the content of which is incorporated by reference herein in its entirety.

TECHNICAL FIELD

The present technology relates to deformable wheels and track systems comprising the deformable wheels.

BACKGROUND

Certain vehicles, such as, for example, agricultural vehicles (e.g., harvesters, combines, tractors, etc.) and construction vehicles (e.g., bulldozers, front-end loaders, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable construction vehicles to be used in wet field conditions as opposed to its wheeled counterpart.

Conventional track systems do, however, present some inconveniences. When overcoming obstacles, endless tracks of the track systems can deform, and the resulting engagement between the support and idler wheel assemblies of the track system can enhance wear, and therefore decrease life of the endless tracks as well as life of the support and idler wheel assemblies.

Therefore, there is a desire for a track system that can mitigate at least some of the above-mentioned issues.

SUMMARY

It is an object of the present technology to ameliorate at least some of the inconveniences present in the prior art.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Note that in the Figures, a "+" symbol is used to indicate an axis of rotation. In the context of the present technology, the term "axis" may be used to indicate an axis of rotation. Also, the terms "pivot assembly" and "wheel assemblies" include all the necessary structure (bearing structures, pins, axles and other components) to permit a structure/wheel to pivot/rotate about an axis, as the case may be. Moreover, the direction of forward travel of the track system is indicated by an arrow in FIG. 1.

In the present description, the "leading" components are components located towards the front of the vehicle defined consistently with the vehicle's forward direction of travel, and the "trailing" components are components located towards the rear of the vehicle defined consistently with the vehicle's forward direction of travel. In the following description and accompanying Figures, the track system is configured to be attached to a right side of the chassis of the vehicle. In the context of the present technology, the qualification of a wheel assembly as "at least indirectly connected" includes a wheel assembly that is directly connected to the at least one wheel-bearing frame member as well as a wheel assembly that is connected to the wheel-bearing frame member through an intermediate structure or structures, be they intermediate frame members or otherwise.

According to one aspect of the present technology, there is provided a deformable wheel including a hub, at least one resilient member connected to the hub and a plurality of circumferentially positioned rim portions connected to the at least one resilient member. Each one of the plurality of rim portions is moveable relative to the hub about the at least one resilient member.

In some embodiments, the deformable wheel has a first configuration, and the at least one resilient member is biased to return the deformable wheel toward the first configuration in response to deformation of the deformable wheel.

In some embodiments, the hub defines an axis of rotation generally perpendicular to a longitudinal plane of the deformable wheel, and each one of the plurality of rim portions is moveable such that, when one of the plurality of rim portions is moved, a projection of the one of the plurality of rim portions on a plane generally perpendicular to the longitudinal plane and containing the axis of rotation is transversal to the axis of rotation.

In some embodiments, the at least one resilient member is deformable about the longitudinal plane of the deformable wheel.

In some embodiments, the longitudinal plane is a longitudinal center plane.

In some embodiments, the hub has a first hub end portion, a second hub end portion and a central hub portion extending between the first and second hub end portions, and the at least one resilient member surrounds the central hub portion and is disposed between the first and second hub portions.

In some embodiments, the at least one resilient member has a plurality of resilient connecting portions extending generally radially.

In some embodiments, each one of the plurality of resilient connecting portions is operationally aligned with one of the plurality of rim portions.

In some embodiments, a number of the plurality of resilient connecting portions is equal to the number of the plurality of rim portions.

In some embodiments, each one of the plurality of rim portions is connected to one of the plurality of resilient connecting portions, each one of the plurality of rim portions being moveable about the longitudinal plane of the deformable wheel.

In some embodiments, each one of the plurality of resilient connecting portions is independent of other ones of the plurality of resilient connecting portions.

In some embodiments, the at least one resilient member is a plurality of resilient connecting members extending generally radially.

In some embodiments, the plurality of resilient connecting members are connected to a radial surface of the hub.

In some embodiments, each one of the plurality of rim portions includes an endless track engaging element.

In some embodiments, the endless track engaging element is a tooth.

In some embodiments, each one of the plurality of resilient connecting members is operationally aligned with one of the plurality of rim portions.

In some embodiments, a number of the plurality of resilient connecting members is equal to a number of plurality of rim portions.

In some embodiments, each one of the plurality of rim portions is connected to one of the plurality of resilient connecting members, each one of the plurality of rim portions being moveable about the longitudinal plane of the deformable wheel.

In some embodiments, each one of the plurality of resilient connecting members is independent of other ones of the plurality of resilient connecting members.

In some embodiments, the at least one resilient member is fixed relative to the hub.

In some embodiments, the resilient member is made from an elastomeric material.

In some embodiments, the rim portions are made from a low friction material.

In some embodiments, the rim portions are made from a metallic material.

In some embodiments, the rim portions are connected to the resilient member by one of overmolding, bonding and fastening.

In some embodiments, the plurality of rim portions are circumferentially spaced.

In some embodiments, the plurality of rim portions are circumferentially spaced so as to receive at least one lug of an endless track between two of the plurality of rim portions.

In some embodiments, the plurality of rim portions is configured to drive the lugs of the endless track.

In some embodiments, the plurality of rim portions is configured to guide the lugs of the endless track.

In some embodiments, each one of the plurality of rim portions is independent of other ones of the plurality of rim portions.

In some embodiments, each one of the plurality of rim portions is moveable independently from other ones of the plurality of rim portions.

In some embodiments, when one of the plurality of rim portions moves in a first direction, another one of the plurality of rim portions is moveable in a second direction.

In some embodiments, each one of the plurality of rim portions has a first longitudinal segment at a first end portion, a second longitudinal segment at a second end portion, and the first longitudinal segment is connected to the second longitudinal segment by an intermediate segment.

In some embodiments, each one of the plurality of rim portions has a first lug contacting portion projecting generally radially inwardly from a first side of the intermediate segment, and a second lug contacting portion projecting generally radially inwardly from a second side the intermediate segment, the first and second lug contacting portions being configured to engage with lugs of an endless track.

In some embodiments, each one of the plurality of rim portions can move relative to the longitudinal center plane of the deformable wheel by about 15 degrees.

In some embodiments, at least some of the plurality of rim portions are in contact with the endless track, and in response to movement of the endless track relative to the wheel hub, at least one of the at least some of the plurality of rim portions moves relative to the wheel hub.

In some embodiments, at least one of the plurality of rim portions moves to conform to the movement of the endless track.

According to another aspect of the present technology there is provided a track system including a frame, a sprocket wheel assembly, at least one idler wheel assembly, at least one support wheel assembly and an elastomeric endless track. The sprocket wheel assembly is rotationally connected to the frame. The at least one idler wheel assembly is rotationally connected to the frame. The at least one support wheel assembly is rotationally connected to the frame. The elastomeric endless track surrounds the frame, the sprocket wheel assembly, the at least one idler wheel assembly and the at least one support wheel assembly. At least one of the sprocket wheel, the at least one idler wheel assembly and the at least one support wheel assembly includes a deformable wheel according to the above aspect or according to the above aspect and one or more of the above embodiments.

In some embodiments, the endless track includes an inner surface and an outer surface, the inner surface having: a set of longitudinally spaced lugs, a first wheel-engaging surface disposed on one side of the set of longitudinally spaced lugs and a second wheel-engaging surface disposed on another side of the set of longitudinally spaced lugs, the second wheel-engaging surface being laterally spaced from the first wheel engaging surface. The first longitudinal segment of the deformable wheel engages with the first wheel-engaging surface, and the second longitudinal segment of the deformable wheel engages with the second wheel-engaging surface.

In some embodiments, each one of the plurality of rim portions, from the first end portion to the second end portion, spans at least 75% of a width of the endless track.

In some embodiments, the frame defines a recess configured to receive the deformable wheel.

In some embodiments, when the track system is operatively connected to a driving axle of a vehicle at a given camber angle, the movement of the rim portions of the deformable wheel relative to the hub compensates, at least partially, for the given camber angle.

According to another aspect of the present technology, there is provided a deformable wheel including a hub and a plurality of rim portions connected to hub. The plurality of rim portions are positioned circumferentially around the hub, and each one of the plurality of rim portions defines a first lateral side and a second lateral side, and includes at least one resilient member extending on one of the first and second lateral sides, the at least one resilient member being configured to resiliently deform.

In some embodiments, the at least one resilient member resiliently deforms by bending.

In some embodiments, the at least one resilient member is biased to return toward an initial position in response to being deformed.

In some embodiments, the at least one resilient member is two resilient members, a first one of the two resilient members extending on the first lateral side of the rim portion, and a second one of the two resilient members extending on the second lateral side of the rim portion.

According to another aspect of the present technology, there is provided a frame, a sprocket wheel assembly, at least one idler wheel assembly, at least one support wheel assembly and an elastomeric track. The sprocket wheel assembly is rotationally connected to the frame. The at least one idler wheel assembly is rotationally connected to the frame. The at least one support wheel assembly is rotationally connected to the frame. The elastomeric endless track surrounds the frame, the sprocket wheel assembly, the at least one idler wheel assembly and the at least one support wheel assembly. In some embodiments, at least one of the sprocket wheel, the at least one idler wheel assembly and the at least one support wheel assembly includes a deformable wheel according to the above aspect or according to the above aspect and one or more of the above embodiments.

According to one aspect of the present technology, there is provided a . . . .

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

For purposes of the present application, terms related to spatial orientation when referring to a vehicle and components, such as track systems, in relation to the vehicle, such as "vertical", "horizontal", "forwardly", "rearwardly", "left", "right", "above" and "below", are as they would be understood by a driver of the vehicle sitting thereon in an upright driving position, with the vehicle steered straight-ahead and being at rest on flat, level ground.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
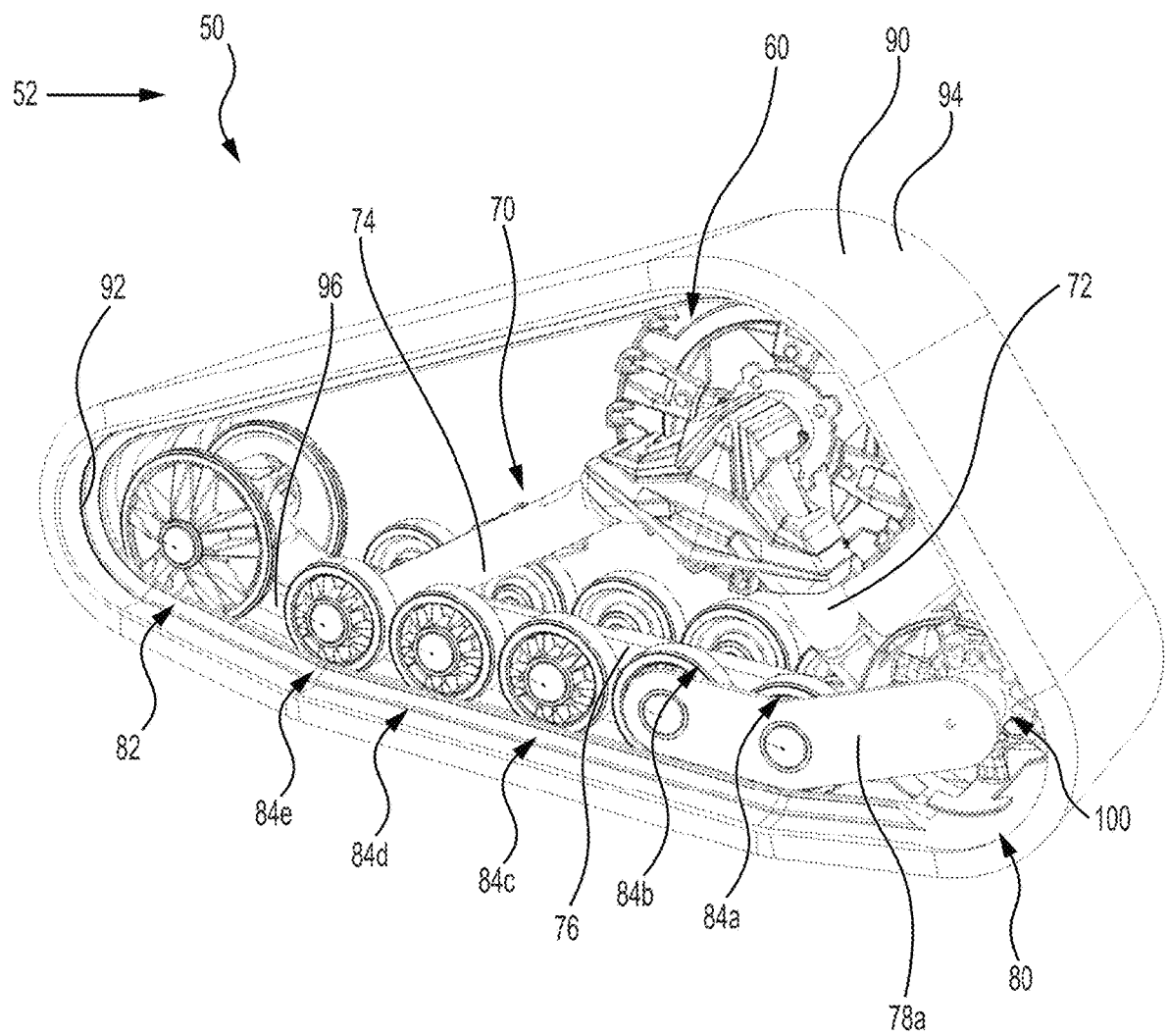
FIG. 1 is a perspective view taken from a top, front, right side of a rear, right track system including a deformable wheel according to a first embodiment of the present technology and an endless track.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

The present technology relates to deformable wheels. Although the present technology is described with reference to a track system having an idler wheel assembly, it is contemplated that the present technology could be used differently, for instance the present technology could be used as a wheel, without being incorporated in a track system.

A track system 50 including the present technology is shown in FIG. 1. The track system 50 is configured to be operatively connectable to a vehicle (not shown). More precisely, the track system 50 is configured to connect to a rear, right side of the vehicle. The vehicle could be a recreational vehicle such as an all-terrain-vehicle, a snowmobile, a side-by-side vehicle or a utility-terrain vehicle. It is also contemplated that the vehicle could be a harvester, a tractor, or another agricultural vehicle. Other vehicles are contemplated, and the track system 50 including the present technology is structured and configured to be used on such vehicles. Though only the rear, right track system 50 is shown and described herein, it is understood that the present technology could be used on front left, front right and/or rear left track systems without departing from the scope of the present technology. It is also contemplated that the present technology could be used as standalone wheels, without being integrated in a track system. The direction of forward travel of the track system 50 is indicated by arrow 52.

Figure 2:
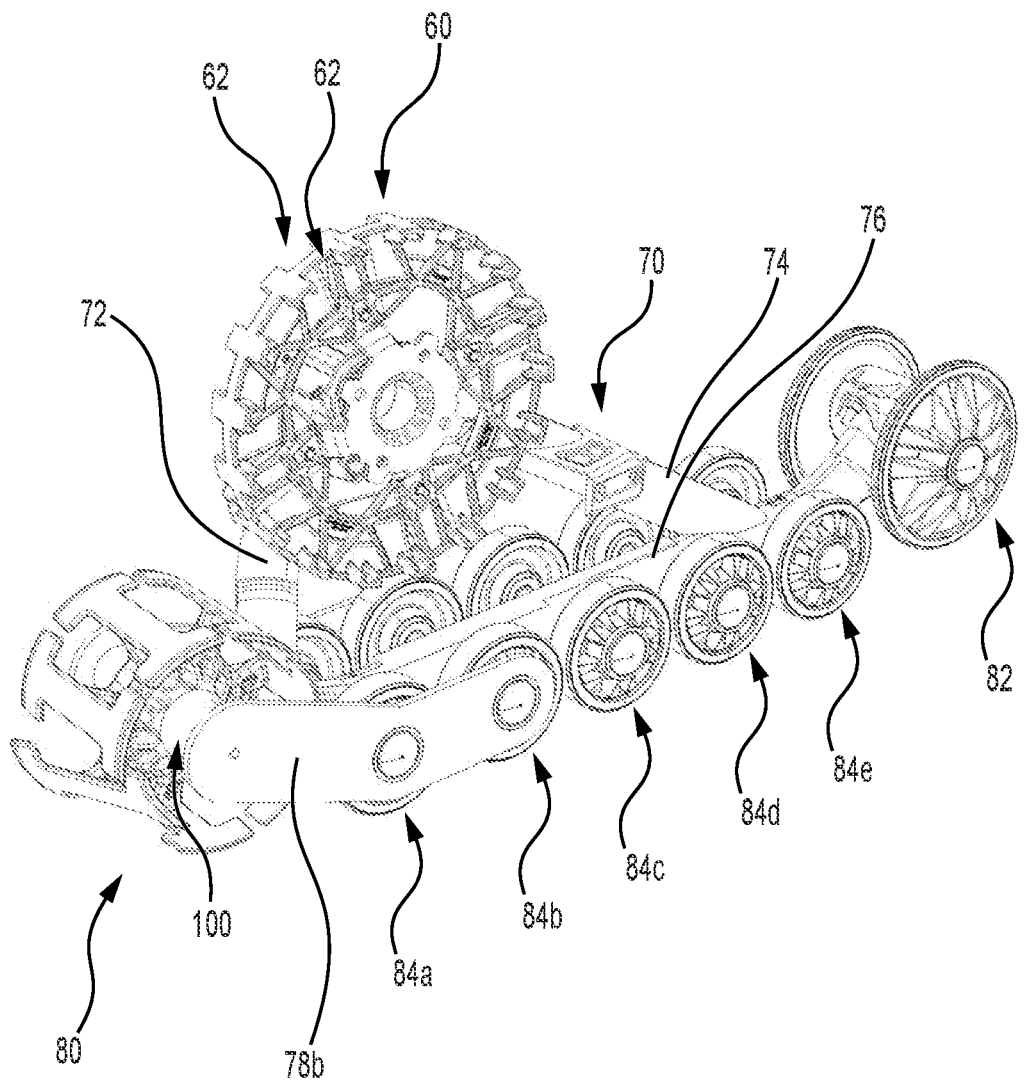
FIG. 2 is a perspective view taken from a top, front, left side of the track system of FIG. 1, with the endless track omitted.

Referring to FIGS. 1 and 2, the track system 50 has a sprocket wheel assembly 60 that is connectable to a driving axle (not shown) of the vehicle. The driving axle can rotate the sprocket wheel assembly 60 which in turn can drive the track system 50. The sprocket wheel assembly 60 defines two sets of laterally spaced recesses 62 that are longitudinally spaced on the circumference of the sprocket wheel assembly 60. The two sets of laterally spaced recesses 62 are configured, as will be described in greater detail below, to receive left and right sets of laterally spaced lugs 96 provided on the endless track 90.

The track system 50 also has a frame 70 to which the sprocket wheel assembly 60 is rotationally connected. The frame 70 has a leading frame arm 72, a trailing frame arm 74 and a lower frame arm 76. The leading and trailing frame arms 72, 74 are jointly connected laterally outwardly from the sprocket wheel assembly 60. The leading frame arm 72 extends downwardly and forwardly from the joint connection and connects to a forward portion of the lower frame arm 76. The trailing frame arm 74 extends downwardly and rearwardly from the joint connection and connects to a rear portion of the lower frame arm 76. As best seen in FIG. 2, the forward and rear portions of the lower frame arm 76 curve upwardly. The frame 70 also includes front frame linkages 78a, 78b, which curve upwardly. The front frame linkages 78a, 78b will be described in greater detail below. It is contemplated that in other embodiments, the frame 70 could be configured differently. For instance, in some embodiments, the frame 70 could have only one frame arm, or more than two frame arms.

The track system 50 includes a leading idler wheel assembly 80 disposed at a forward portion of the track system 50, a trailing idler wheel assembly 82 disposed at a rear portion of the track system 50 and five support wheel assemblies 84a, 84b, 84c, 84d, 84e disposed between the leading and trailing idler wheel assemblies 80, 82. It is contemplated that in some embodiments, there could be more or less than five support wheel assemblies.

The trailing idler wheel assembly 82 is rotationally connected to the frame 70, at the lower frame arm 76. The trailing idler wheel assembly 82 includes a set of two laterally spaced wheels. It is contemplated that in some embodiments, the trailing idler wheel assembly 82 could include a single wheel. In other embodiments, the trailing idler wheel assembly 82 could include three or more laterally spaced wheels.

The support wheel assemblies 84a, 84b, 84c, 84d, 84e are also rotationally connected to the frame 70, also at the lower frame arm 76. The support wheel assemblies 84a, 84b are also rotationally connected to the front frame linkages 78a, 78b. The support wheel assemblies 84a, 84b, 84c, 84d, 84e include a set of two laterally spaced wheels. It is contemplated that in some embodiments, the support wheel assemblies 84a, 84b, 84c, 84d, 84e could include a single wheel. In other embodiments, the support wheel assemblies 84a, 84b, 84c, 84d, 84e could include three or more laterally spaced wheels.

The leading idler wheel assembly 80 is rotationally connected to the frame 70 by the front frame linkages 78a, 78b. It is contemplated that in some embodiments, the leading idler wheel assembly 80 could be rotationally connected to the frame 70 differently, such as for instance without the front frame linkages 78a, 78b. The leading idler wheel assembly 80 comprises a deformable wheel 100, which will be described in more detail below.

The track system 50 further includes the endless track 90 which extends around components of the track system 50, including the sprocket wheel assembly 60, the frame 70, the leading and trailing idler wheel assemblies 80, 82 as well as the support wheel assemblies 84a, 84b, 84c, 84d, 84e. The endless track 90 has the inner surface 92 and an outer surface 94. The inner surface 92 of endless track 90 has the left and right sets of longitudinally spaced lugs 96 (shown schematically in FIG. 1). The lugs 96 are configured to be received within the recesses 62 of the sprocket wheel assembly 60. It is contemplated that in some embodiments, there could be only one set of lugs 96. In other embodiments, there could be three or more sets of lugs 96. The outer surface 94 of the endless track 90 has a tread (not shown) defined thereon. It is contemplated that the tread could vary from one embodiment to another. In some embodiments, the tread could depend on the type of vehicle on which the track system 50 is to be used and/or the type of ground surface on which the vehicle is destined to travel. In the present embodiment, the endless track 90 is an endless polymeric track. It is contemplated that in some embodiments, the endless track 90 could be constructed of a wide variety of materials and structures known in track systems 50. It is contemplated that in some embodiments, the endless track 90 could have reinforcing members therein. The reinforcing members could extend laterally and/or longitudinally across the endless track 90.

Figure 3:
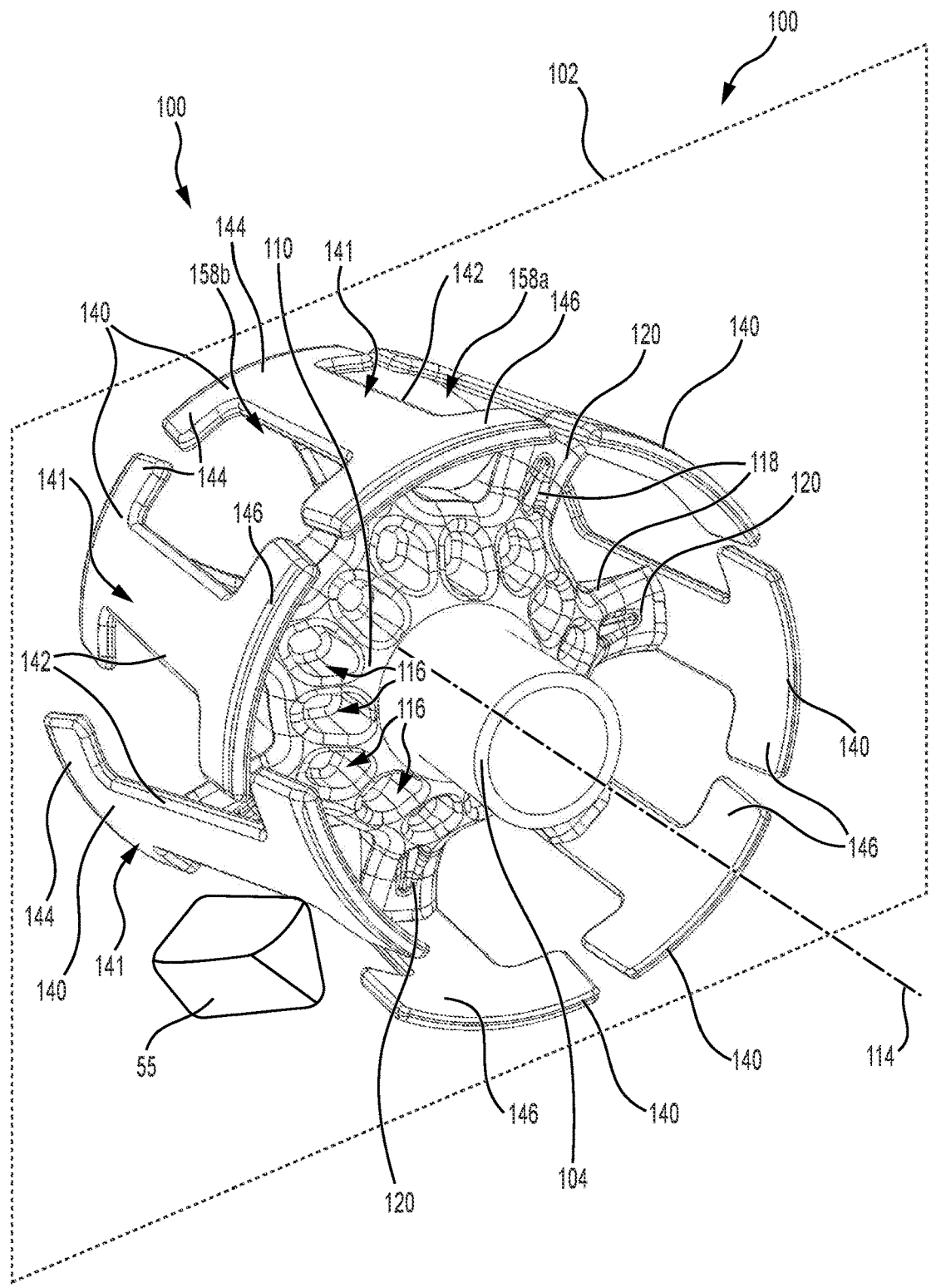
FIG. 3 is a perspective view taken from a top, front, left side of the deformable wheel of FIG. 1.
Figure 4:
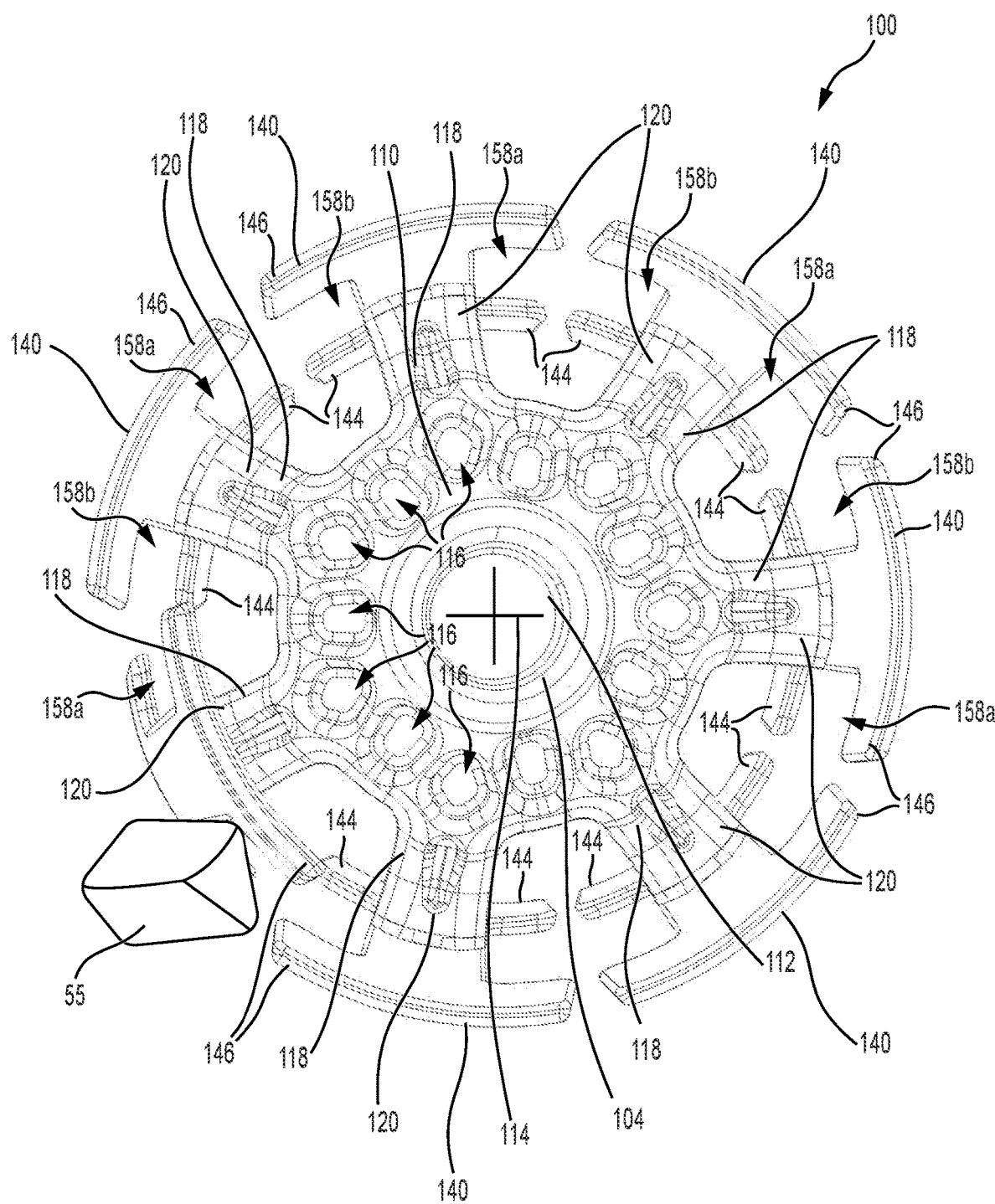
FIG. 4 is a perspective view taken from a left side of the deformable wheel of FIG. 1.

Referring to FIGS. 3 and 4, the deformable wheel 100 which depicts a first embodiment of the present technology will now be described in greater detail. As mentioned above, the leading idler wheel assembly 80 includes the deformable wheel 100, however it is contemplated that in other embodiments, the sprocket wheel assembly 60, the trailing idler wheel assembly 82 and/or one or more of the support wheel assemblies 84a, 84b, 84c, 84d, 84e could be configured to include the deformable wheel 100.

The deformable wheel 100 defines a longitudinal plane 102 that passes through the deformable wheel 100, and splits the deformable wheel 100 into a left longitudinal side and a right longitudinal side. In the present embodiment, the longitudinal plane 102 is a longitudinal center plane 102. In other embodiments, the longitudinal plane 102 could be offset from a center of the deformable wheel 100.

The deformable wheel 100 is connected to an axle 104, which in turn is rotationally connectable to the front frame linkages 78a, 78b (shown in FIGS. 1 and 2), such that the deformable wheel 100 is rotationally connectable to the frame 70.

The deformable wheel 100 has a radially extending hub 110 that is connected to the axle 104. More precisely, the hub 110 defines a hub aperture 112 that is configured to receive the axle 104 therethrough. In some embodiments, the hub aperture 112 could be configured to receive the axle 104 as well as a bearing structure, such that deformable wheel 100 could be free to rotate relative to the axle 104. The hub 110 defines a hub axis 114 that extends generally perpendicularly to the longitudinal center plane 102 and that extends through the center of the hub 110 (i.e. at a center of the hub aperture 112). The hub axis 114 extends generally perpendicularly to the longitudinal center plane 102. The hub 110 also defines a plurality of recesses 116, which can help reduce the amount of material required to manufacture the hub 110. As shown in the FIGS. 3 and 4, the hub 110 defines fourteen recesses 116. It is contemplated that in some embodiments, there could be more or less than fourteen recesses 116. For instance, in some embodiments, the recesses 116 could be omitted. In other embodiments, the recesses 116 could be apertures. The hub 110 further has seven radially extending projections 118 that are circumferentially spaced, and extend from a radial surface of the hub 110. It is contemplated that in some embodiments, there could be more or less than seven projections 118. The hub 110 is made from a generally rigid material such as metal and/or a rigid plastic.

The deformable wheel 100 also has seven resilient members 120 that are connected to the hub 110. More precisely, each one of the seven resilient members 120 is connected to one of the seven projections 118, such that the resilient members 120 are circumferentially spaced from one another. In some embodiments, there could be more or less than seven resilient members 120.

In some embodiments, the seven projections 118 could be omitted, and the seven resilient members 120 could be connected to the radial surface of the hub 110.

The resilient members 120 are connected to the projections 118 by overmolding. It is, however, contemplated that the seven resilient members 120 could be connected to the hub 110 and/or to the seven projections 118 by bonding and/or fastening. The resilient members 120 are made from a resilient material such as rubber. In some embodiments, the resilient members 120 could have reinforcing members and/or fibers therein such as, for instance, glass fibers and/or nylon fibers.

The resilient members 120 are fixed relative to the hub 110, such that when the hub 110 rotates about the hub axis 114, the resilient members 120 also generally rotate about the hub axis 114. The resilient members 120 each have an initial position, where each one of the resilient members 120 is generally centered across the longitudinal center plane 102. In some embodiments, the resilient members 120 could be offset from the longitudinal center plane 102. The resilient members 120 are resiliently deformable about the longitudinal center plane 102, and are biased to return toward their initial position after being deformed. The resilient members 120 are deformable along and/or across the longitudinal center plane 102. Each one of the resilient members 120 is independent from the other resilient members 120. Therefore, as will be described in greater detail below, in some instances, deformation of one resilient member 120 does not cause deformation of another one of the resilient members 120.

The deformable wheel 100 further has seven rim portions 140, where each one of the rim portions 140 is connected to one of the resilient members 120. Each one of the rim portions 140 is operationally aligned with one of the resilient members 120 such that the rim portions 140 are also circumferentially spaced. In some embodiments, the rim portions 140 could be very close to one another, so long as the rim portions 140 are free to move with respect to one another. The rim portions 140 are connected to the resilient members 120 by overmolding. In some embodiments, the rim portion 140 could be connected to the resilient member 120 by bonding and/or fastening.

As one may notice, the number of rim portions 140 is equal to the number of resilient members 120 (i.e., seven of each). It is contemplated that in some embodiments, there could be more or less resilient members 120 than rim portions 140.

As the rim portions 140 are identical, only one will be described in detail herewith. The rim portion 140 spans a majority of a width of the endless track 90. In some embodiments, the rim portion 140 could span more than half of the width of the endless track 90. In some embodiments, the rim portion 140 could span about 70% of a width of the endless track 90. In other embodiments, the rim portion 140 could span 60% of a width of the endless track 90. In yet other embodiments, the rim portion 140 could span 50% of a width of the endless track 90. The rim portion 140 has an outer surface 141 that is configured to engage with the inner surface 92 of the endless track 90. The rim portion 140 has an intermediate segment 142 that extends generally laterally from the longitudinal center plane 102 to left and right sides of the rim portion 140. More precisely, the rim portion 140 has a left longitudinal segment 144 connected to the intermediate segment 142 at the left side and a right longitudinal segment 146 connected to the intermediate segment 142 at the right side. The left and right longitudinal segments 144, 146 extend longitudinally relative to the intermediate segment 142, such that the rim portion 140 defines a leading recess 158a, and a trailing recess 158b. The leading recess 158a of one of the rim portions 140 and the trailing recess 158b of an adjacent rim portion 140 are configured to receive one of the lugs 96 therein. This can help the deformable wheel 100 guide the endless track 90, and avoid "de-tracking" and/or "tooth-skipping". The intermediate segment 142 and the left and right longitudinal segments 144, 146 are arched, such that the rim portions 140 communally form a generally circular shape and a generally circular periphery of the deformable wheel 100. The rim portion 140 is made from a low-friction material. In some embodiments, the low friction material could be polyethylene such as high molecular weight polyethylene or ultra-high molecular weight polyethylene. In other embodiments, the rim portion 140 could be made from a metallic material, or another suitable material. It is further contemplated that in some embodiments, the rim portion 140 could have a protective layer disposed on the outer surface 141. The protective layer could be configured to reduce friction, while extending life of the rim portion 140. In some embodiments, as will be described in greater detail below with reference to FIG. 9, the rim portion 140 could have an endless track engaging element such as a tooth thereon.

The rim portions 140 have an initial position, where each one of the rim portions 140 is generally centered across the longitudinal center plane 102. The rim portions 140 are moveable about the longitudinal center plane 102 as well as about the hub 110, and are biased to return toward their initial position due to the corresponding resilient members 120 to which the rim portions 140 are connected. The rim portions 140 are moveable along and/or across to the longitudinal center plane 102. In some embodiments, the movement of each one of the rim portions 140 could be a pivotal motion about a pivot axis defined by the resilient member 120 to which the rim portion 140 is connected, where the pivot axis is contained in the longitudinal center plane 102. Similarly to the resilient members 120, each one of the rim portions 140 is independent from the other rim portions 140 such that movement of one of the rim portions 140 does not cause movement of the other rim portions 140.

As mentioned above, the resilient members 120 and the rim portions 140 each have an initial position. As such, the deformable wheel 100 also has an initial configuration, in which the resilient members 120 and the rim portions 140 are in their initial positions.

Still referring to FIGS. 3 and 4, a description of the deformable wheel 100 and a portion of the track system 50 as the deformable wheel 100 overcomes an obstacle 55 will now be provided. The obstacle 55 could be a rock, a ditch or uneven terrain. For the illustrative example provided herebelow, the obstacle 55 is a rock 55.

When the track system 50 is on a flat, level surface, the track system 50 is in an initial configuration, such that the deformable wheel 100 is in the initial configuration, as shown in FIG. 1.

When the track system 50 initially encounters the rock 55, a leading portion of the endless track 90 deforms, at least to some extent, to conform to the rock 55.

When the rock 55 is below the leading idler wheel assembly 80 (see FIGS. 3 and 4), the endless track 90 and the deformable wheel 100 deform. In the illustrative example provided herewith, the rock 55 is disposed on a left side of the track system 50, and thus on the left side of the deformable wheel 100. The rock 55 causes the endless track 90 to deform, which in turn causes at least the rim portion 140 in contact with the endless track 90 and the corresponding resilient member 120 to deform to conform to the deformation of the endless track 90. More precisely, the left longitudinal segment 144 moves generally upwardly, the right longitudinal segment 146 moves generally downwardly, and the resilient member 120 deforms to enable this movement. In some instances, the rim portion 140 can move such that a projection thereof on a plane perpendicular to the longitudinal center plane 102 and containing the hub axis 114 is transversal to the hub axis 114. When the rock 55 causes the resilient member 120 to be offset from its initial position, the resilient member 120 is biased to return toward its initial position, and therefore also biases the rim portion 140 to return to its initial position. The biasing forces can assist the track system 50 to overcome the rock 55.

As mentioned above, it is contemplated that in some embodiments, the movement of the rim portion 140 could be a pivotal motion about the pivot axis defined by the resilient member 120 to which the rim portion 140 is connected.

As it is the rim portions 140 and the corresponding resilient members 120 that deform, the axle 104 to which the deformable wheel 100 is connected does not pivot. As such, although the rim portions 140 may individually move laterally, lateral movement of the deformable wheel 100 as a whole is minimized while the deformable wheel 100 is conforming to the deformation of the endless track 90. Minimizing lateral movement can assist in reducing wear resulting from friction due to misalignment (i.e., inner side of the left longitudinal segment 144 engages with a laterally outward side of the lug 96). Minimizing lateral movement can also reduce chances of "de-tracking".

In some embodiments, the deformable nature of the deformable wheel 100 increases how much the endless track 90 can deform when compared to non-deformable wheels. It is understood that in some embodiments, the deformable wheel 100 could be configured to limit how much the endless track 90 can deform.

In addition, the resilient nature of the resilient members 120 can enhance ride quality of a vehicle by absorbing shocks and impacts.

Furthermore, in instances where the track system 50 is connected to the driving axle a given camber angle, the movement of the rim portions 140 of the deformable wheel 100 relative to the hub 110 can compensate, at least partially, for the given camber angle.

When the rock 55 is below the support wheel assemblies 82a, 82b, 82c, 82d, 82e, the deformation of the endless track 90 is partially limited by the presence of the support wheel assemblies 82a, 82b, 82c, 82d, 82e, as the support wheel assemblies 82a, 82b, 82c, 82d, 82e are not configured to pivot to conform to the deformation of the endless track 90. Similarly, when the rock 55 is below the trailing idler wheel assembly 82, the deformation of the endless track 90 is partially limited by the presence of the trailing idler wheel assembly 82, as the trailing idler wheel assembly 82 is not configured to pivot to conform to the deformation of the endless track 90. This can exacerbate wear induced in the track system 50. As mentioned above, it is contemplated that in some embodiments, the trailing idler wheel assembly 82 and/or the support wheel assemblies 82a, 82b, 82c, 82d, 82e could include the deformable wheel 100, or alternatively could be configured to, at least to some extent, pivot relative to the frame 70 to conform to the deformation of the endless track 90.

Figure 5:
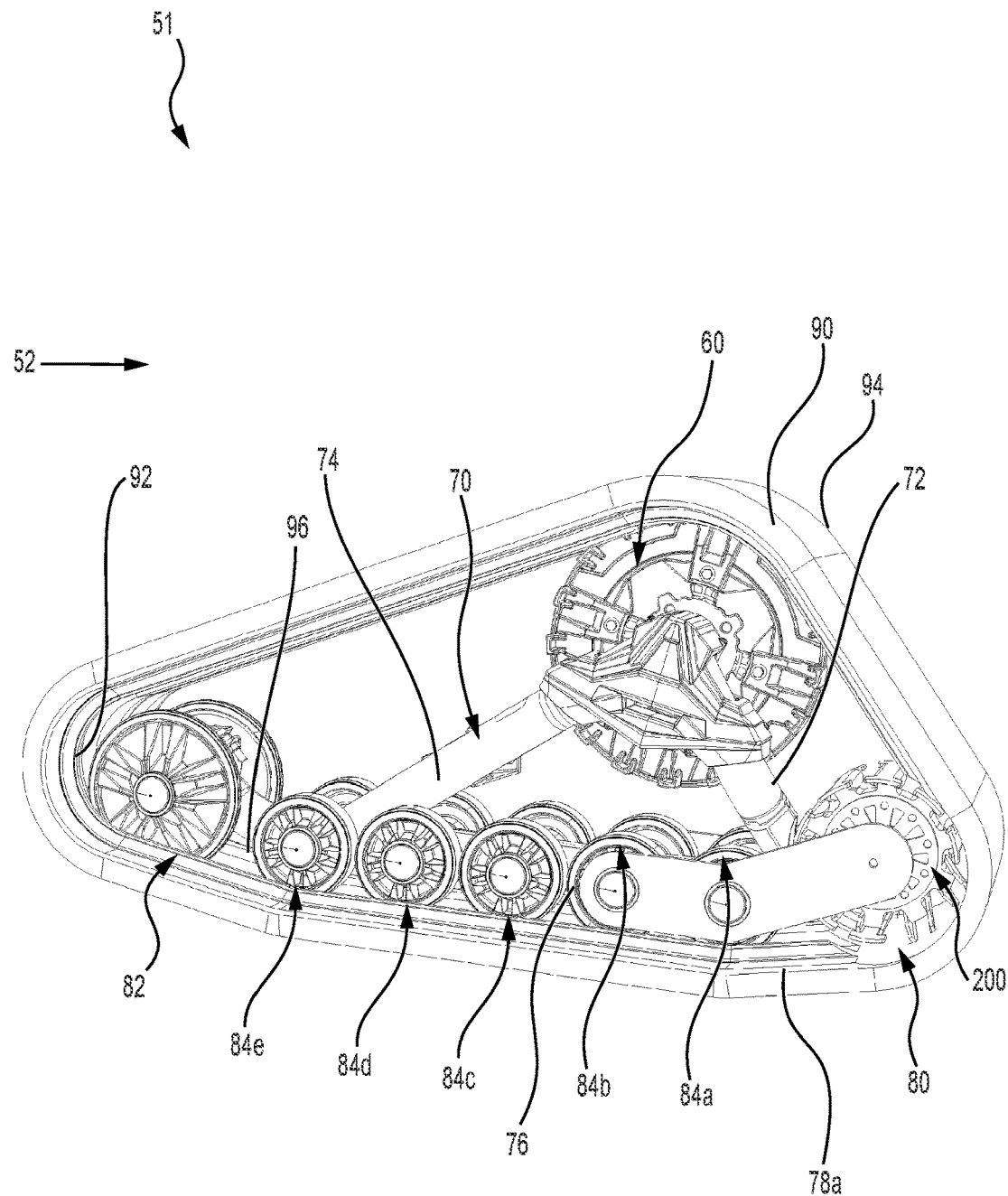
FIG. 5 is a perspective view taken from a top, front, right side of a rear, right track system including a deformable wheel according to another embodiment of the present technology and an endless track.
Figure 6:
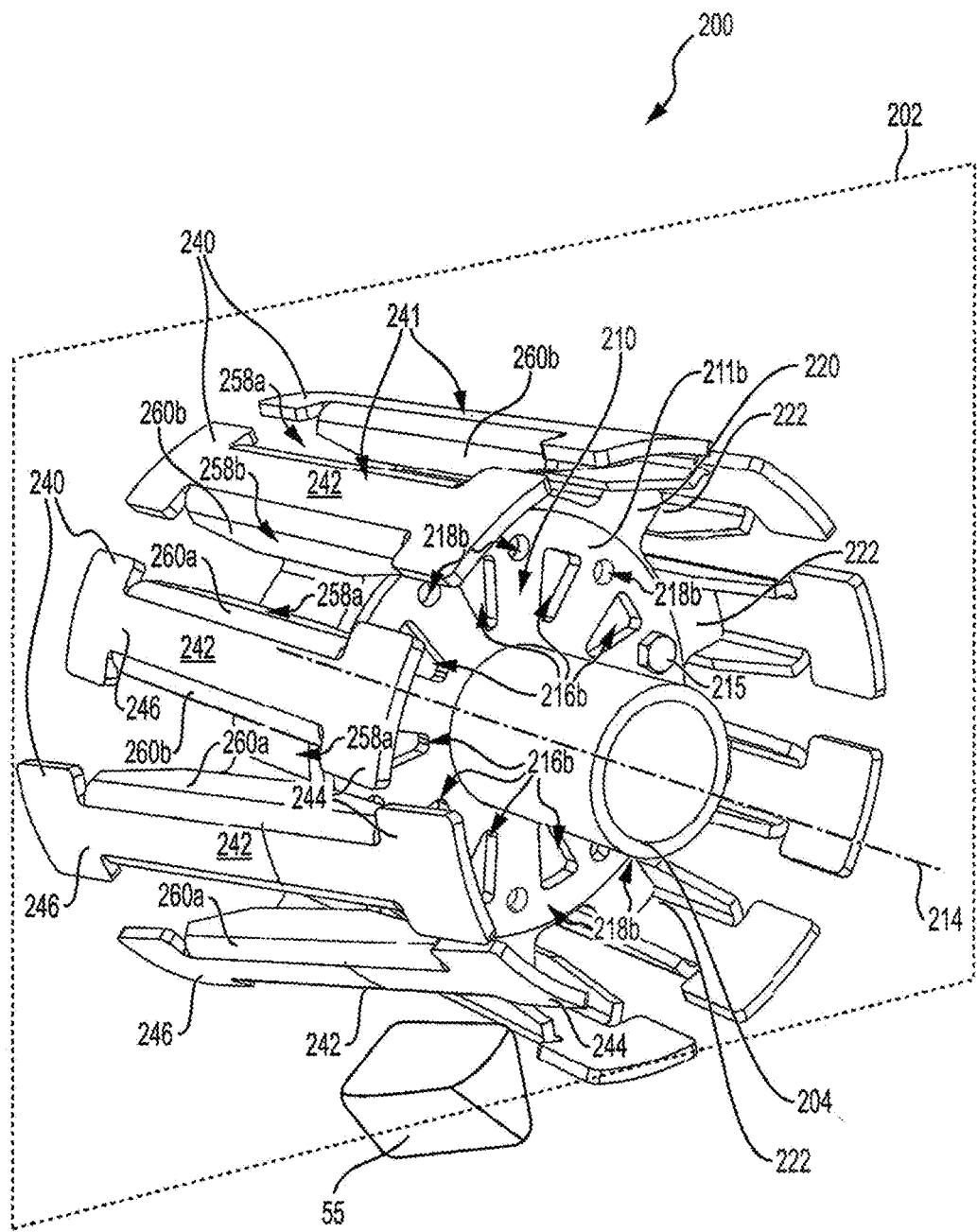
FIG. 6 is a perspective view taken from a top, front, left side of the deformable wheel of FIG. 5.

Referring to FIGS. 5 to 8, a second embodiment of the present technology, namely deformable wheel 200, will now be described in greater detail. It is understood that the deformable wheel 200 could be used within a track system 51 (as shown in FIG. 5) and/or as a standalone wheel. The track system 51 is very similar to the track system 50, and hence will not be re-described. Features of the track system 51 that are the same as features of the track system 50 have been labeled with the same reference numerals.

The deformable wheel 200 defines a longitudinal plane 202 that passes through the deformable wheel 200, and splits the deformable wheel 200 into a left longitudinal side and a right longitudinal side. In the present embodiment, the longitudinal plane 202 is a longitudinal center plane 202. In other embodiments, the longitudinal plane 202 could be offset from a center of the deformable wheel 200.

The deformable wheel 200 is connected to an axle 204, which in turn is rotationally connectable to the front frame linkages 78a, 78b (shown in FIG. 5), such that the deformable wheel 200 is rotationally connected to the frame 70.

The deformable wheel 200 has a hub 210 that includes a hub end portion 211a and a hub end portion 211b. The hub end portions 211a, 211b are laterally spaced. In some embodiments, the hub end portions 211a, 211b could be connected to one another by a central portion. The hub end portions 211a, 211b are connected to the axle 204. More precisely, the hub end portion 211a defines a hub aperture 212a, and the hub end portion 211b defines a hub aperture 212b. The hub apertures 212a, 212b (FIG. 8) are configured to receive the axle 204 therethrough. In some embodiments, the hub apertures 212 could be configured to receive the axle 204 as well as a bearing structure, such that deformable wheel 200 could be free to rotate relative to the axle 204. The hub 210 defines a hub axis 214 that extends generally perpendicularly to the longitudinal center plane 202, and that extends through the center of the hub end portions 211a, 211b (i.e., at a center of the hub apertures 212a, 212b). The hub end portion 211a defines a plurality of apertures 216a, and a plurality of apertures 218a. Similarly, the hub end portion 211b defines a plurality of apertures 216b and a plurality of apertures 218b. The apertures 216a, 216b can help reduce the amount of material required to manufacture the hub end portions 211a, 211b. The apertures 218a, 218b are configured to each receive a fastener 215 therethrough (only one fastener shown in FIGS. 6 and 8). In some embodiments, the apertures 216a, 216b could be omitted. In yet other embodiments, the apertures 218a, 218b could be omitted.

The deformable wheel 200 also has a resilient member 220 that is disposed between hub end portions 211a, 211b.

The resilient member 220 is connected to the hub end portions 211a, 211b by the fasteners 215. In some embodiments, the resilient member 220 could be connected differently, such as, for instance, by bonding. The resilient member 220 defines an aperture 221 that is configured to receive the axle 204 therethrough. Thus, the aperture 221 is similar to the apertures 212a, 212b. The resilient member 220 has a plurality of resilient portions 222. More precisely, the resilient member 220 has ten resilient portions 222. It is contemplated that in other embodiments, the resilient member 220 could have more or less than ten resilient portions 222. The resilient portions 222 extend generally radially from a radial surface of the resilient member 220, and are circumferentially spaced from one another. As such, the resilient member 220 has a gear-like shape. The resilient member 220 is fixed relative to the hub 210, such that when the hub 210 rotates about the hub axis 214, the resilient member 220, and thus the resilient portions 222, also generally rotate about the hub axis 214. The resilient portions 222 each have an initial position, where the resilient portions 222 are generally centered along the longitudinal center plane 202. In some embodiments, the resilient portions 222 could be offset from the longitudinal center plane 202 in the initial position. The resilient portions 222 are resiliently deformable about the longitudinal center plane 202, and are biased to return toward their corresponding initial position after being deformed. The resilient portions 222 are deformable along and or across the longitudinal center plane 202. In the present embodiment, the resilient portions 222 are, to some extent, dependent on the other (adjacent/close) resilient portions 222. Thus, deformation of one resilient portion 222 can influence the deformation of another one of the (adjacent/close) resilient portions 222. For example, if one resilient portion 222 is deformed, it can limit and/or induce deformation in another one of the resilient portions 222. The resilient portions 222 are made from an elastomeric material such as rubber. In some embodiments, the resilient member 220 and/or the resilient portions 222 could have reinforcing members and/or fibers therein such as, for instance, glass fibers and/or nylon fibers.

The deformable wheel 200 further has ten rim portions 240, where each one of the rim portions 240 is connected to one of the resilient portions 222. Each one of the rim portions 240 is operationally aligned with one of the resilient portions 222 such that the rim portions 240 are also circumferentially spaced. In some embodiments, the rim portions 240 could be very close to one another, so long as the rim portions 140 are free to move with respect to one another. The rim portions 240 are connected to the resilient portions 222 by overmolding. In some embodiments, the rim portions 240 could be connected to the resilient portions 222 by bonding and/or fastening.

As one may notice, the number of rim portions 240 is equal to the number of resilient portions 222 (i.e., ten of each). It is contemplated that in some embodiments, there could be more or less resilient portions 222 than rim portions 240.

As the rim portions 240 are identical, only one will be described in detail herewith. The rim portion 240 spans a majority of a width of the endless track 90. In some embodiments, the rim portion 240 could span more than half of the width of the endless track 90. In some embodiments, the rim portion 240 could span about 70% of a width of the endless track 90. In other embodiments, the rim portion 240 could span 60% of a width of the endless track 90. In yet other embodiments, the rim portion 240 could span 50% of a width of the endless track 90. The rim portion 240 has an outer surface 241 that is configured to engage with the inner surface 92 of the endless track 90. The rim portion 240 has an intermediate segment 242 that extends generally laterally from the longitudinal center plane 202 to left and right sides of the rim portion 240. The rim portion 240 has a left longitudinal segment 244 connected to the intermediate segment 242 at the left side and a right longitudinal segment 246 connected to the intermediate segment 242 at the right side. The left and right longitudinal segments 244, 246 extend longitudinally, both forwardly and rearwardly, relative to the intermediate segment 242, such that the rim portion 240 defines a leading recess 258 a, and a trailing recess 258 b. The rim portion 240 also has a leading lug contacting portion 260 a extending radially inwardly from and along a leading side of the rim portion 240 (i.e., within the leading recess 258 a) and a trailing lug contacting portion 260 b extending radially inwardly from and along a trailing side of the rim portion 240 (i.e., within the trailing recess 258 b). The leading recess 258 a of one of the rim portions 240 and the trailing recess 258 b of an adjacent rim portion 240 are configured to receive one of the lugs 96 therein. The leading and trailing lug contacting portions 260 a, 260 b can help to guide and to synchronize the endless track 90 to avoid "de-tracking" and/or "tooth-skipping" The intermediate segment 242 and the left and right longitudinal segments 244, 246 are also arched, such that the rim portions 240 communally form a generally circular shape and a generally circular periphery of the deformable wheel 200. The rim portions 240 is made from a low-friction material. In some embodiments, the low friction material could be polyethylene such as high molecular weight polyethylene or ultra-high molecular weight polyethylene. In other embodiments, the rim portion 240 could be made from a metallic material, or another suitable material. It is further contemplated that in some embodiments, the rim portion 240 could have a protective layer disposed on the outer surface 241. The protective layer could be configured to reduce friction, while extending life of the rim portion 240.

The rim portions 240 have an initial position, where the rim portions 240 are generally centered across the longitudinal center plane 202. The rim portions 240 are moveable about the longitudinal center plane 202 as well as about the hub 210, and are biased to return toward their initial position due to the corresponding resilient portions 222 to which the rim portions 240 are connected. The rim portions 240 are moveable along and/or across to the longitudinal center plane 202. In some embodiments, the movement of each one of the rim portions 240 could be a pivotal motion about a pivot axis defined by the resilient portion 222 to which the rim portion 240 is connected, where the pivot axis is contained in the longitudinal center plane 102. Each one of the rim portions 240 is independent from the other rim portions 240 such that movement of one of the rim portions 240 does not directly cause movement of the other rim portions 240. However, the movement of one of the rim portions 240 could induce deformation in the resilient member 220, which in turn could cause movement of another one of the (adjacent/close) rim portions 240.

As mentioned above, the resilient portions 222 and the rim portions 240 each have an initial position. As such, the deformable wheel 200 also has an initial configuration, in which the resilient portions 222 and the rim portions 240 are in their initial positions.

Figure 9:
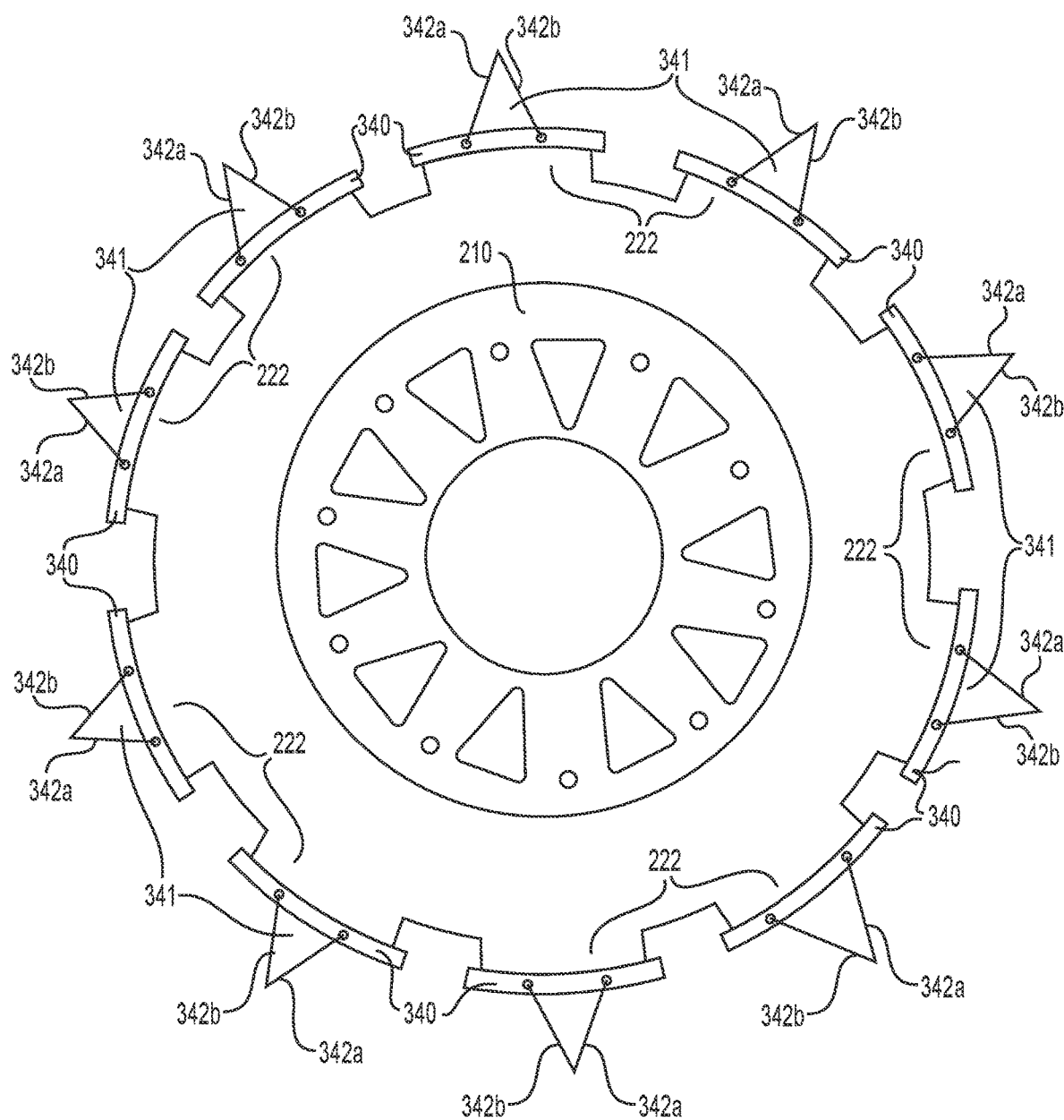
FIG. 9 is a left side elevation view of a deformable wheel according to another embodiment of the present technology.

Referring to FIG. 9, an alternate embodiment of the deformable wheel 200 is a driving deformable wheel 300. Features of the driving deformable wheel 300 that are similar to the features of the deformable wheel 200 have been labeled with the same reference numerals.

Instead of the ten rim portions 240, the deformable wheel 300 has ten rim portions 340. It is contemplated that in some embodiments, the deformable wheel 300 could have more or less than ten rim portions 340. As the ten rim portions 340 are similar, only one will be described herewith. The rim portion 340 has an outer surface on which extends an endless track engaging element 341. The endless track engaging element 341 is a tooth 341. The tooth 341 extends generally laterally from a longitudinal center plane of the deformable wheel 300 to left and right sides of the rim portion 340. The tooth 341 has a leading lug contacting surface 342a and trailing lug contacting surface 342b. The tooth 341, is configured to engage with the lugs 96 of the endless track 90 by the leading and/or trailing lug contacting surfaces 342a, 342b. The teeth 341 on the deformable wheel 300 can, in some instances, help to enhance transmission of motion compared to embodiments where the teeth 341 are omitted.

The deformable wheel 200 works similarly to the deformable wheel 100, and hence will only be briefly described as the track system 51 and the deformable wheel 200 overcomes a rock 155.

Figure 7:
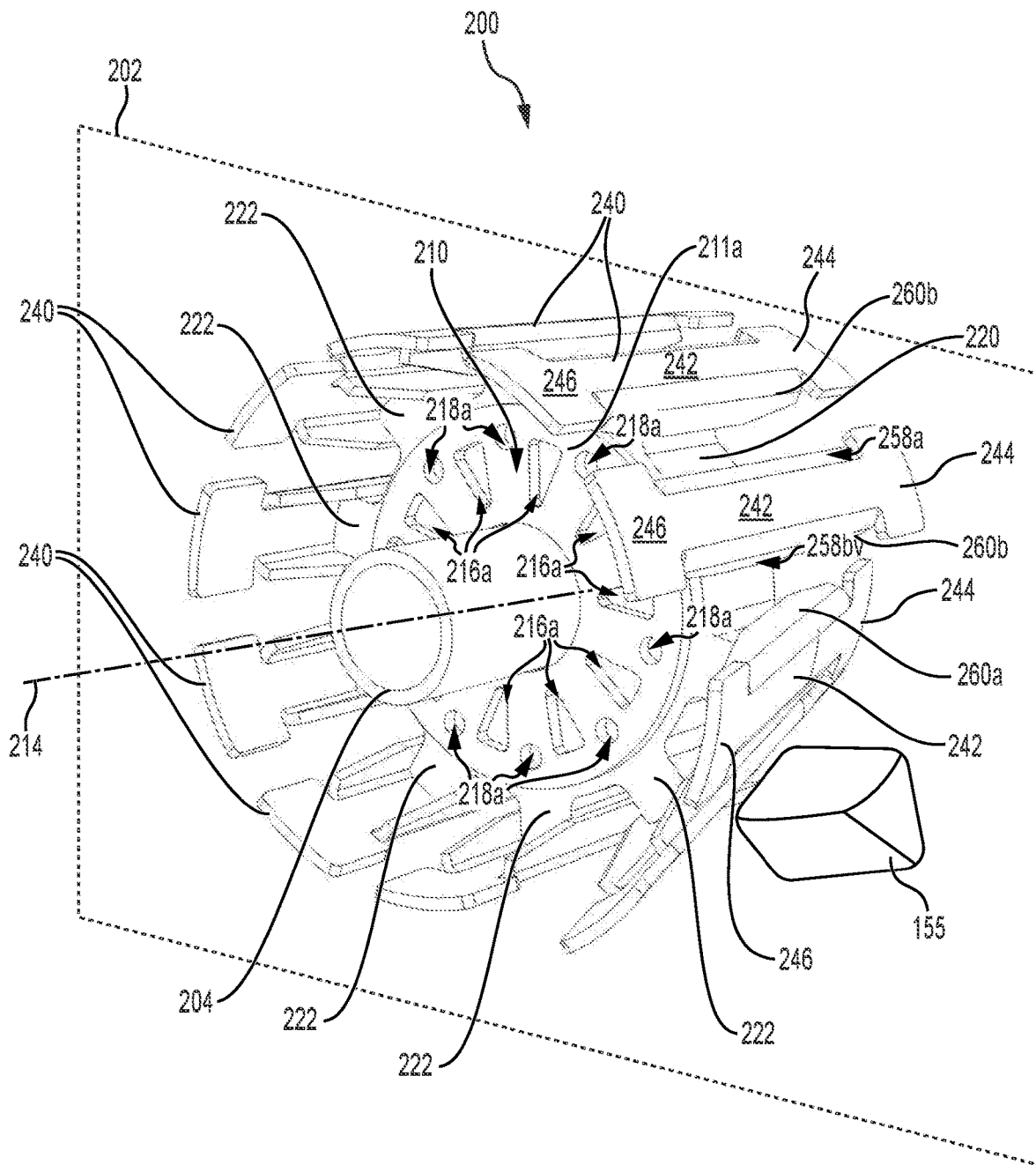
FIG. 7 is a perspective view taken from a top, front, right side of the deformable wheel of FIG. 5.
Figure 8:
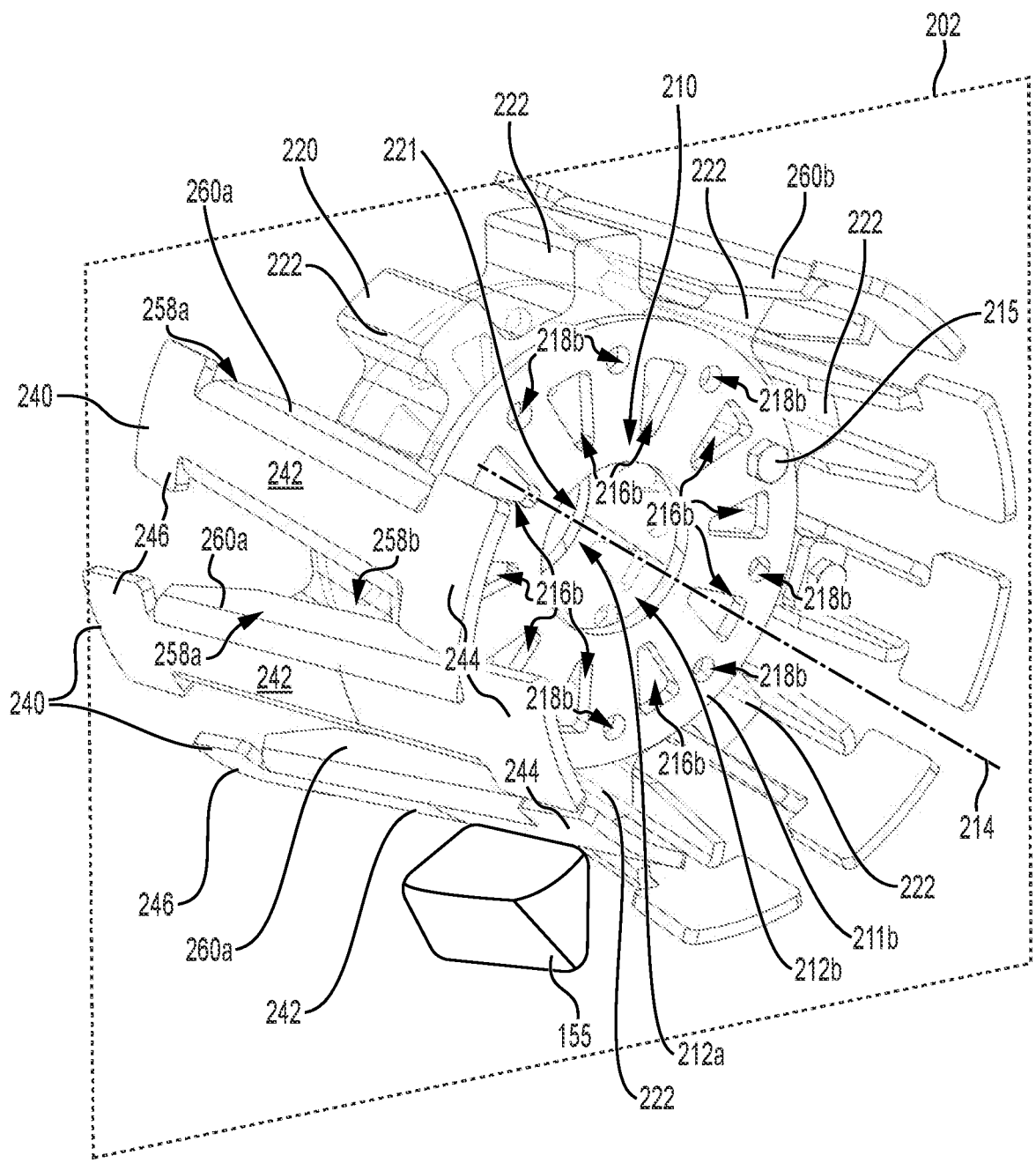
FIG. 8 is a perspective view taken from a top, front, left side of the deformable wheel of FIG. 5, with some rim portions being omitted.

Referring to FIGS. 7 and 8, when the rock 155 is below the leading idler wheel assembly 80, the endless track 90 and the deformable wheel 200 deform. In the illustrative example provided herewith, the rock 155 is disposed on a left side of the track system 51, and thus on the left side of the deformable wheel 200. The rock 155 causes the endless track 90 to deform, which in turn causes at least rim portion 240 in contact with the endless track 90 and the corresponding resilient portions 222 to deform to conform to the deformation of the endless track 90. More precisely, the left longitudinal segment 244 moves generally upwardly, the right longitudinal segment 246 moves generally downwardly, and the resilient portion 222 deforms to enable the movement of the rim portion 240. In some instances, the rim portion 240 can move such that a projection thereof on a plane perpendicular to the longitudinal center plane 202 and containing the hub axis 214 is transversal to the hub axis 214. As soon as the rock 155 causes the resilient portion 222 to be offset from its initial position, the resilient portion 222 is biased to return toward its initial position, and therefore also biases the rim portion 240 to return to its initial position. The biasing forces can help the track system 51 to overcome the rock 155.

As mentioned above, it is contemplated that in some embodiments, the movement of the rim portion 240 could be a pivotal motion about the pivot axis defined by the resilient portion 222 to which the rim portion 240 is connected.

Similarly to the deformable wheel 100, as it is the rim portions 240 and the corresponding resilient portions 222 that deform, the axle 204 to which the deformable wheel 200 is connected does not pivot. As such, although the rim portions 240 may move laterally, lateral movement of the deformable wheel 200 as a whole is minimized while the deformable wheel 200 is conforming to the deformation of the endless track 90. For the same reasons mentioned above, this can help reduce wear as well as reduces chances of "de-tracking".

Also as mentioned above, in instances where the track system 51 is connected to the driving axle a given camber angle, the movement of the rim portions 240 of the deformable wheel 200 relative to the hub 210 can compensate, at least partially, for the given camber angle.

Figure 10:
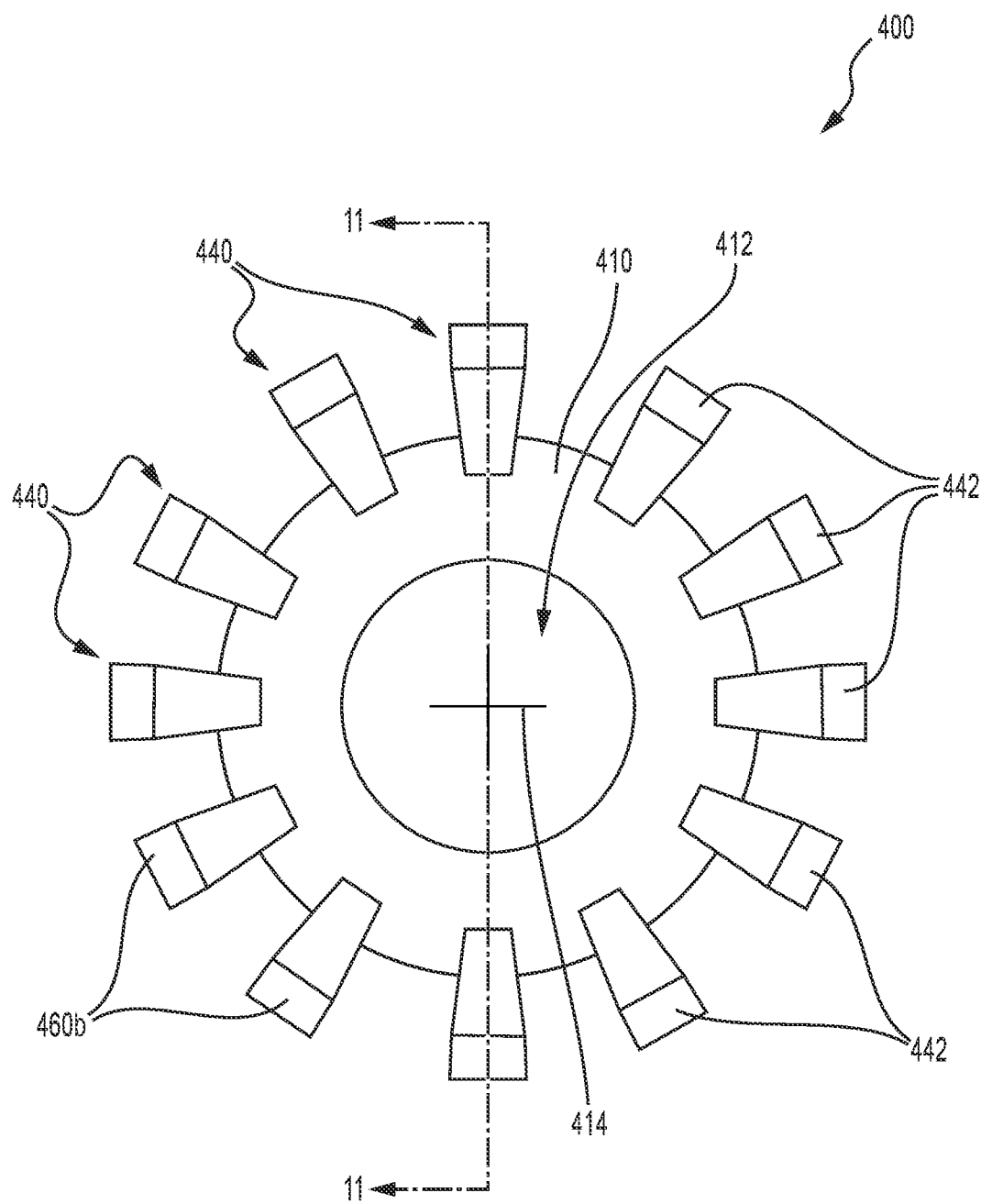
FIG. 10 is a left side elevation view of a deformable wheel according to another embodiment of the present technology.
Figure 11:
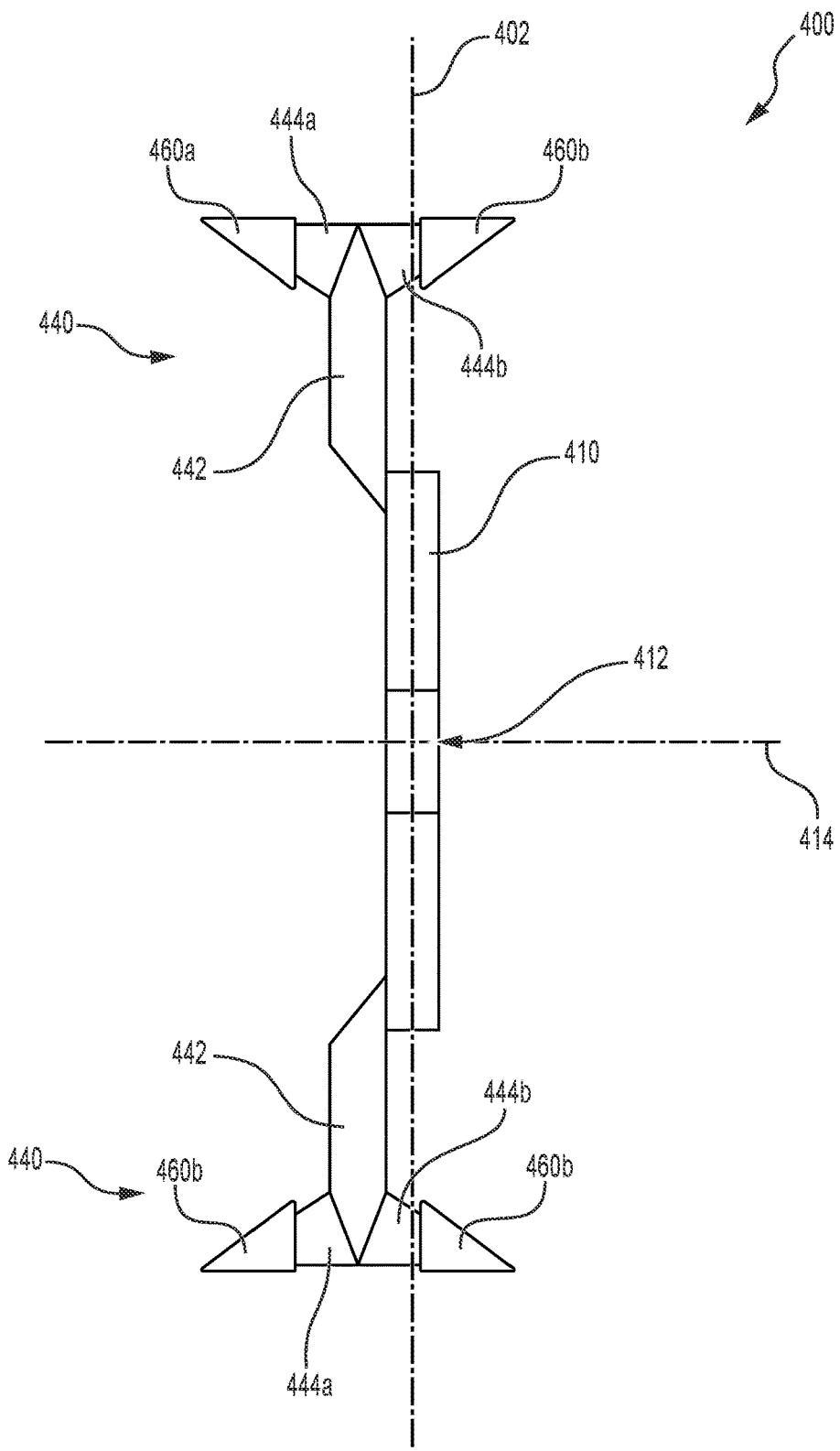
FIG. 11 is a cross-sectional view taken along the line 11-11 of FIG. 10 of the deformable wheel of FIG. 10.

Referring now to FIGS. 10 and 11, a fourth embodiment of the deformable wheel 100, namely deformable wheel 400, will be described. The deformable wheel 400 is very similar to the deformable wheels 100, 200, 300, and thus will only be broadly described.

The deformable wheel 400 defines a longitudinal plane 402 (shown in FIG. 11) that passes through the deformable wheel 400, and splits the deformable wheel 400 into a left longitudinal side and a right longitudinal side. In the present embodiment, the longitudinal plane 402 is a longitudinal center plane 402. In other embodiments, the longitudinal plane 402 could be offset from a center of the deformable wheel 400.

The deformable wheel 400 has a radially extending hub 410 that is configured to connect to an axle 404, and that extends across the longitudinal center plane 402. The hub 410 defines a hub aperture 412 that is configured to receive the axle 404 therethrough. In some embodiments, the hub aperture 412 could be configured to receive the axle 404 as well as a bearing structure, such that deformable wheel 100 could be free to rotate relative to the axle 404. The hub 410 defines a hub axis 414 that extends generally perpendicularly to the longitudinal center plane 402 and that is disposed at a center of the hub 410 (i.e. at a center of the hub aperture 412).

The deformable wheel 400 also has a plurality of rim portions 440 connected to the hub 410. More precisely, the deformable wheel 400 has twelve rim portions 440. It is contemplated that in other embodiments, there could be more or less than twelve rim portions 440. The rim portions 440 are circumferentially spaced from one another. As the rim portions 440 are similar, only one rim portion 440 will be described in detail herewith.

The rim portion 440 has a connecting segment 442, a left segment 444a and a right segment 444b. The connecting segment 442 connects the rim portion 440 to the hub 410. More precisely, the connecting segment 442 is connected to hub 410 by a fastener 406. It is contemplated that in other embodiments, the connecting segments 442 could be connected to the hub 410 differently, such as for instance by welding and/or bonding.

The connecting segment 442, which extends radially away from the hub 410, is offset from the longitudinal center plane 402 of the deformable wheel 400, as best seen in FIG. 11. It is contemplated that in some embodiments, the connecting segment 442 could be centered along the longitudinal center plane 402. The left segment 444 a extends laterally from the connecting segment 442, toward the left longitudinal side of the deformable wheel 400, and the right segment 444 b extends laterally from the connecting segment 442 toward the right longitudinal side of the deformable wheel 400. The connecting segment 442 and the left and right segments 444 a, 444 b are integral. In some embodiments, it is contemplated that the connecting segment 442 and the left and right segments 444 a, 444 b could be distinct parts connected to one another. It is also contemplated that in some embodiments, the rim portion 440 could be integral with the hub 410. It is also contemplated that in some embodiments, the left segment 444 a and the right segment 444 b can be of different lengths.

The rim portion 440 further has a left resilient member 460a connected to the left segment 444a and a right resilient member 460b connected to the right segment 444b. It is contemplated that in some embodiments, there could only be a left and/or a right resilient member. It is also contemplated that in some embodiments, the left and right resilient members could be unitary.

The left and right resilient members 460a, 460b are configured to resiliently deform. Furthermore, the left and right resilient members 460a, 460b have an initial position, and when the left and right resilient members 460a, 460b are resilient deformed, the left and right resilient members 460a, 460b are biased to return toward their initial position. Thus, the deformable wheel 400 also has an initial configuration, in which the left and right resilient members 460a, 460b are in their initial positions.

Figure 12:
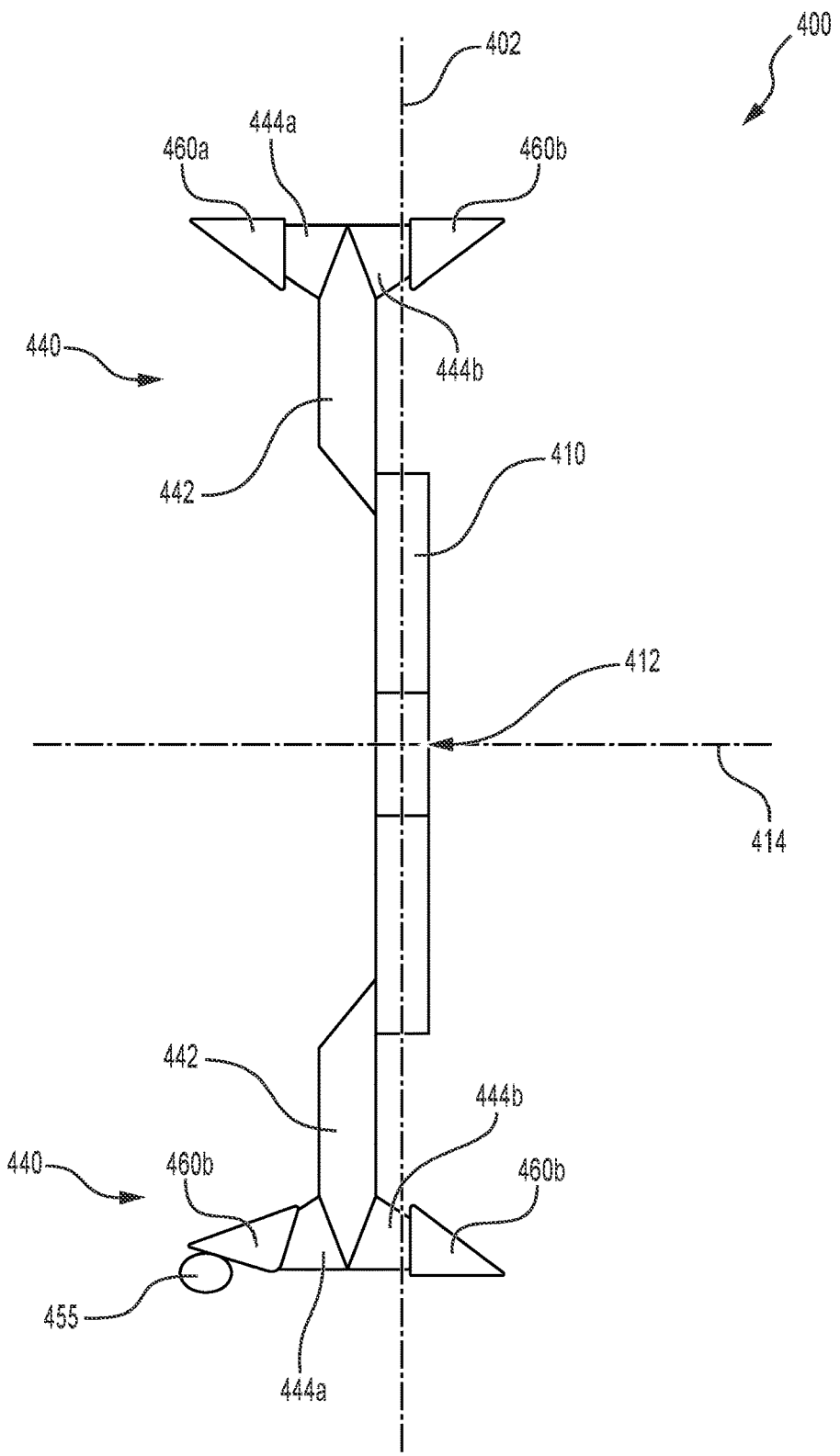
FIG. 12 is a cross-sectional view of the deformable wheel of FIG. 10 as the deformable wheel is overcoming an obstacle.

Referring to FIG. 12, a description of the deformable wheel 400 overcoming an obstacle 455, a rock 455, will now be broadly provided.

When the rock 455 is below the deformable wheel 400, the endless track that the deformable wheel 400 is engaging, and the deformable wheel 400 deform. In the illustrative example provided herewith, the rock 455 is disposed on a left side of the deformable wheel 400. The rock 455 causes the endless track to deform, which in turn causes at least the left resilient member 460a in contact with the endless track to deform to conform to the deformation of the endless track. More precisely, the left resilient member 460 moves generally upwardly. As soon as the rock 455 causes the left resilient member 460a to be offset from its initial position, the left resilient member 460a is biased to return toward its initial position. The biasing force can help the deformable wheel 400, and thus the track system to which the deformable wheel 400 is connected, to overcome the rock 455.

Similarly to the deformable wheels 100, 200 as it is the left and right resilient members 460a, 460b, the axle 204 to which the deformable wheel 200 is connected does not pivot. As such, although the rim portions 440 may move laterally, lateral movement of the deformable wheel 400 as a whole is minimized while the deformable wheel 400 is conforming to the deformation of the endless track 90. For the same reasons mentioned above, this can help reduce wear as well as reduces chances of "de-tracking".

Referring to FIGS. 13 to 16, a further embodiment of the present technology, namely deformable wheel 500, will now be described in greater detail. It is understood that the deformable wheel 500 could be used within a track system 51 (as shown in FIG. 5). The deformable wheel 500 could also be used in a track system of oblong shape and configuration. Additionally, and as will be further discussed below, the deformable wheel 500 could be used as a standalone wheel. The track system 51 is very similar to the track system 50, and hence will not be re-described.

Figure 13:
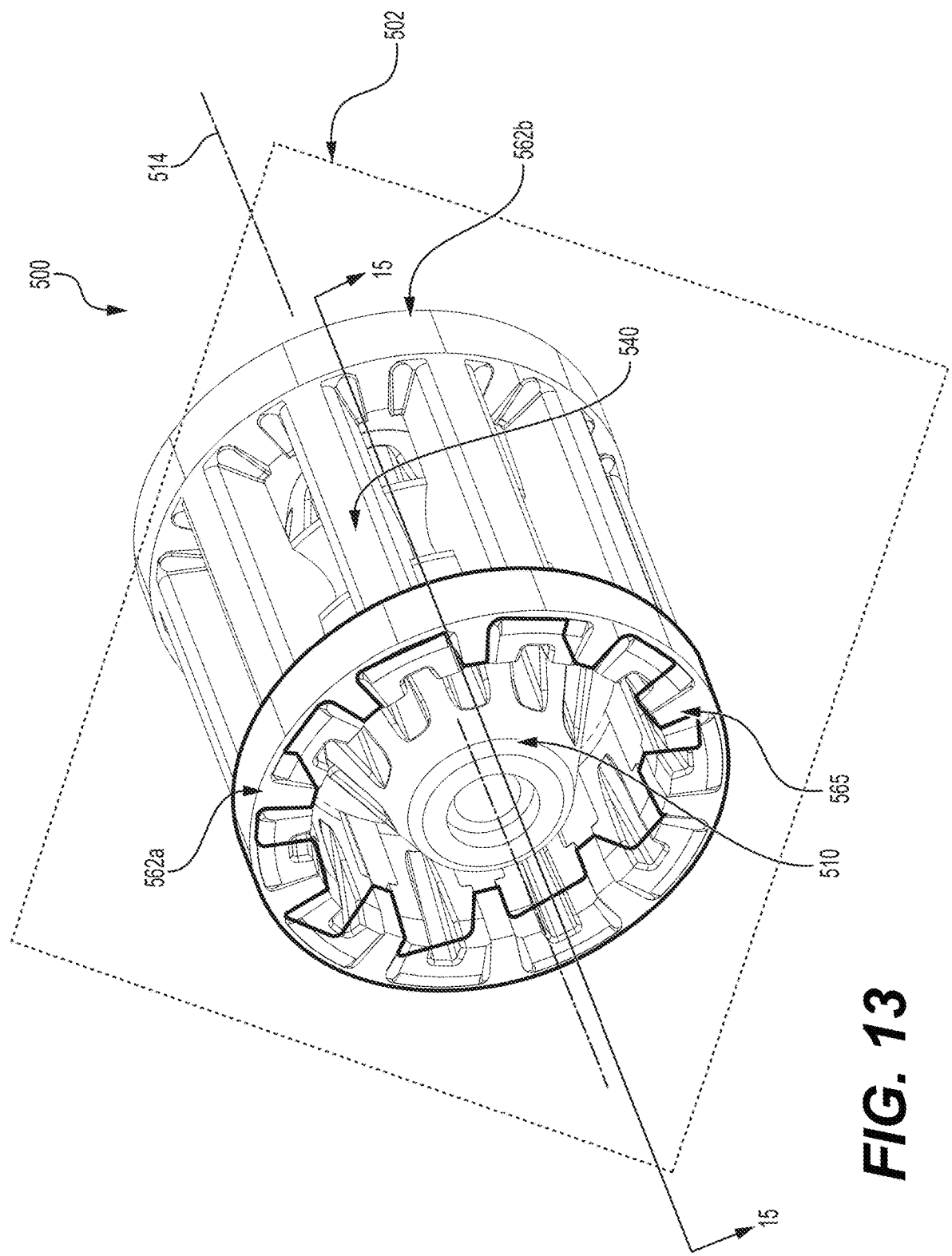
FIG. 13 is a perspective view taken from a top, front, right side of the deformable wheel according to an embodiment of the present technology.

As seen in FIG. 13, the deformable wheel 500 defines a longitudinal plane 502 that passes through the deformable wheel 500 and splits the deformable wheel 500 into a left longitudinal side and a right longitudinal side. In the present embodiment, the longitudinal plane 502 is a longitudinal center plane 502. In other embodiments, the longitudinal plane 502 could be offset from a center of the deformable wheel 500. The deformable wheel 500 is connected to an axle, which in turn is rotationally connectable to the front frame linkages 78a, 78b (shown in FIG. 5), such that the deformable wheel 500 is rotationally connected to the frame 70.

The deformable wheel 500 has a hub 510. In this embodiment, the hub 510 is of a prolate spheroid shape (e.g., football-like shape). The hub 510 has a central portion 512 and two tapered portions 516a, 516b extending axially on each side of the central portion 512. Central portion 512 comprises a central groove 518 for accommodating resilient member 520 (described here below) as will be described below. Although in this embodiment, the central groove 518 is continuous around the periphery of the central portion 512, it is understood that in some other instances, the central groove 518 could be discontinuous around the periphery of the central portion 512. The central groove 518 defines a concave shape simulating a pivot that allows to facilitate movement of the rim portions. The tapered portions 516a, 516b allow the majority of rim portions 540 (described here below) to pivot considerably before coming into contact with the hub 510. It is further understood that the central groove 518 could have other forms and/or shapes without departing from the present embodiment.

Figure 15:
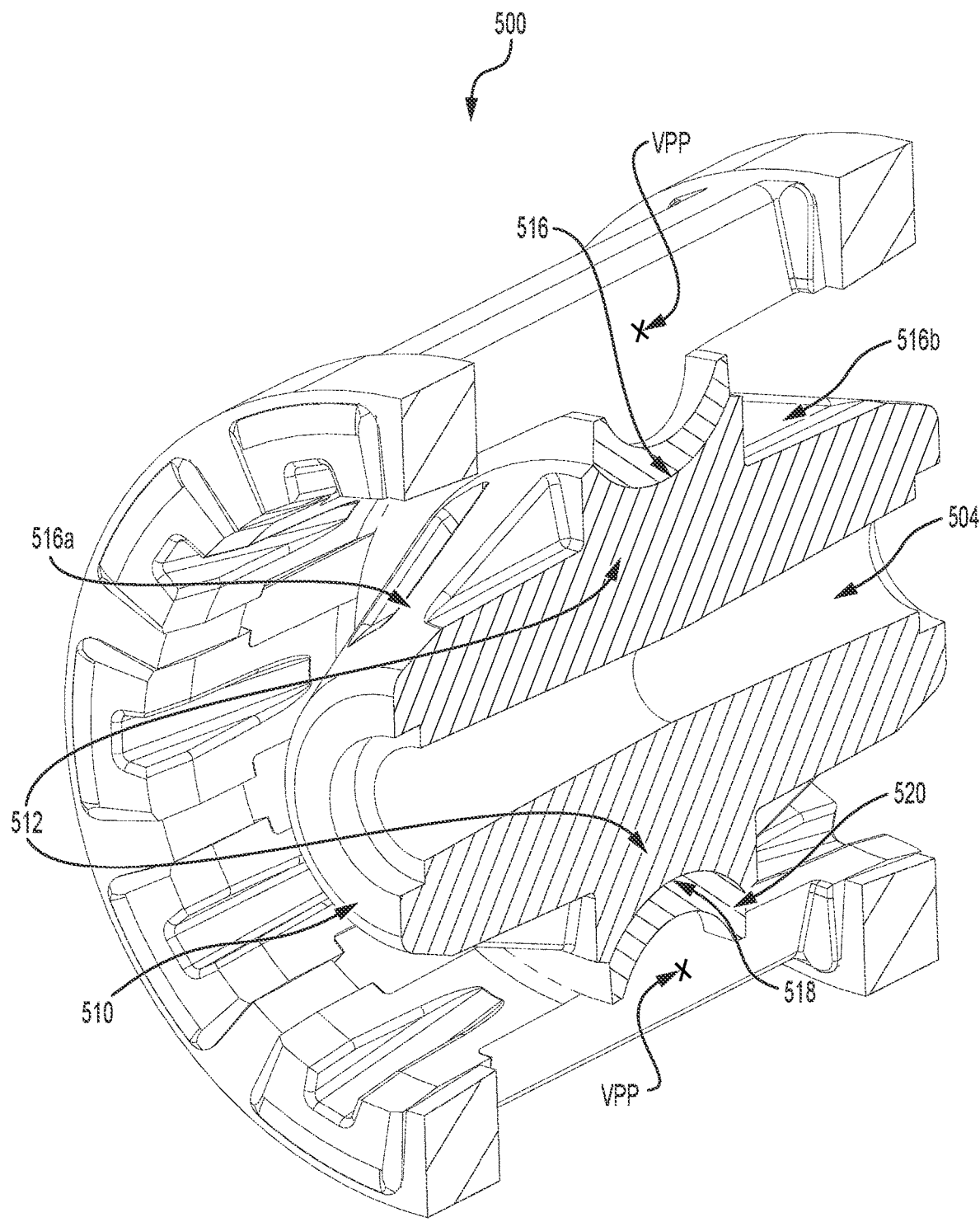
FIG. 15 is a cross-sectional view taken along the line 15-15 of FIG. 13 of the deformable wheel of FIG. 13.

The deformable wheel 500 comprises resilient member 520. In this embodiment, resilient member 520 is a single piece (as opposed to several resilient members). The resilient member 520 is a rubber ring. However, the resilient member 520 may be made of other resilient materials without departing from the present embodiment. As depicted in FIG. 15, the resilient member 520 has a shape that is complementary to the shape of the central groove 518, and has a cross-section that is concave so as to be complementary to that of the central groove 518. The resilient member 520 is fixed relative to the hub 510, such that when the hub 510 rotates about the hub axis 514, the resilient member 520 also generally rotates about the hub axis 514. The resilient member 520 can be overmolded, glued, fastened, interlocked, and/or mechanically interlocked to the hub 510. In some instances, the resilient member 520 may act, at least indirectly, as a pivot with respect to the central groove 518. In some instances, the pivot has an arcuate cross-section ("croissant-like shape") and provides a virtual pivot point (VPP) located away from the hub 510 so that the resilient member 520 is positioned between the hub 510 and the virtual pivot point VPP reducing lateral movement of the rim portion 540 relative to the inner surface 92 of the endless track 90 thereby preventing premature weare of the endless track 90 and/or of the deformable wheel 500, and/or detracking of the track system 50.

Figure 14:
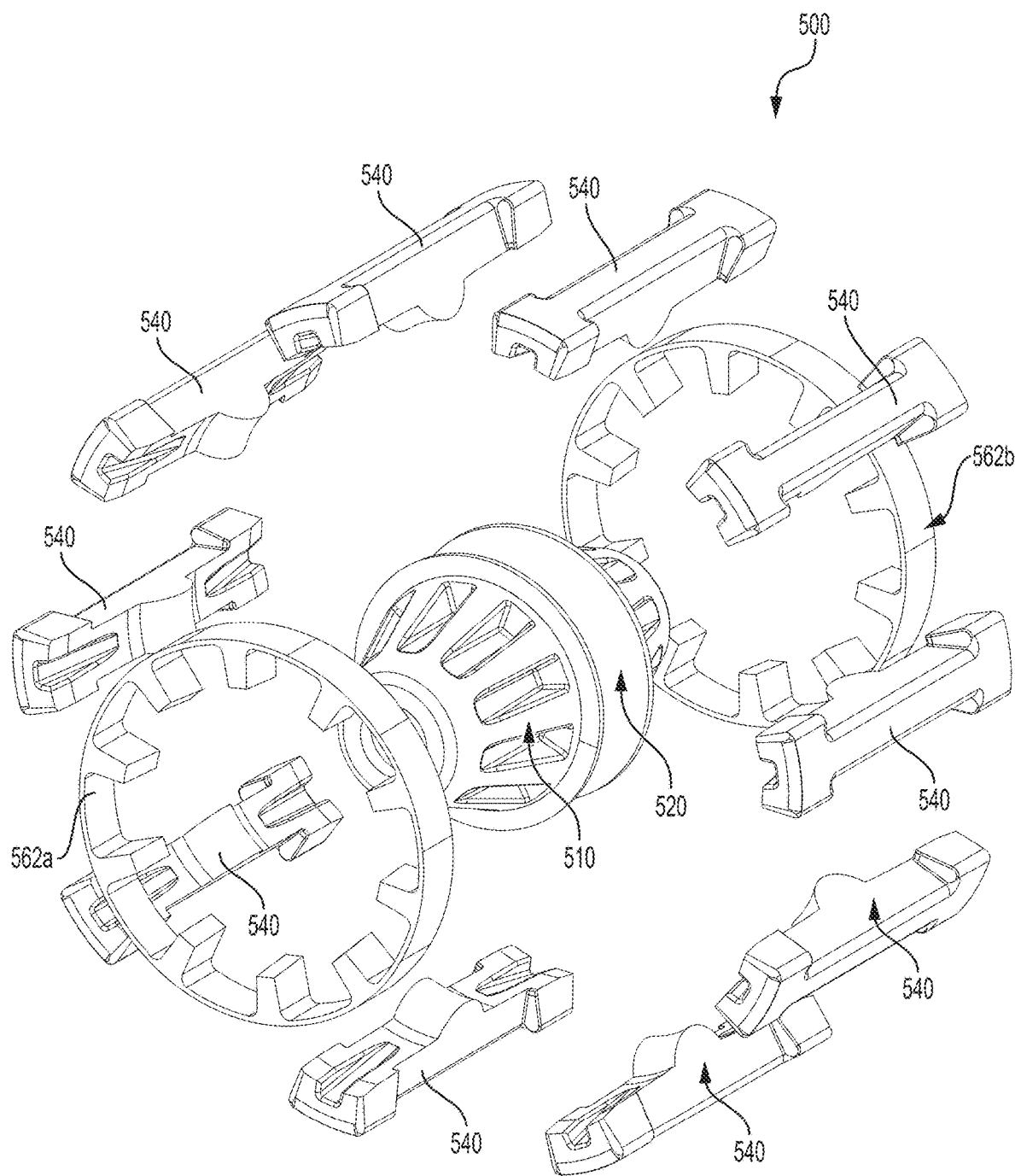
FIG. 14 is an exploded view of the deformable wheel of FIG. 13.
Figure 16:
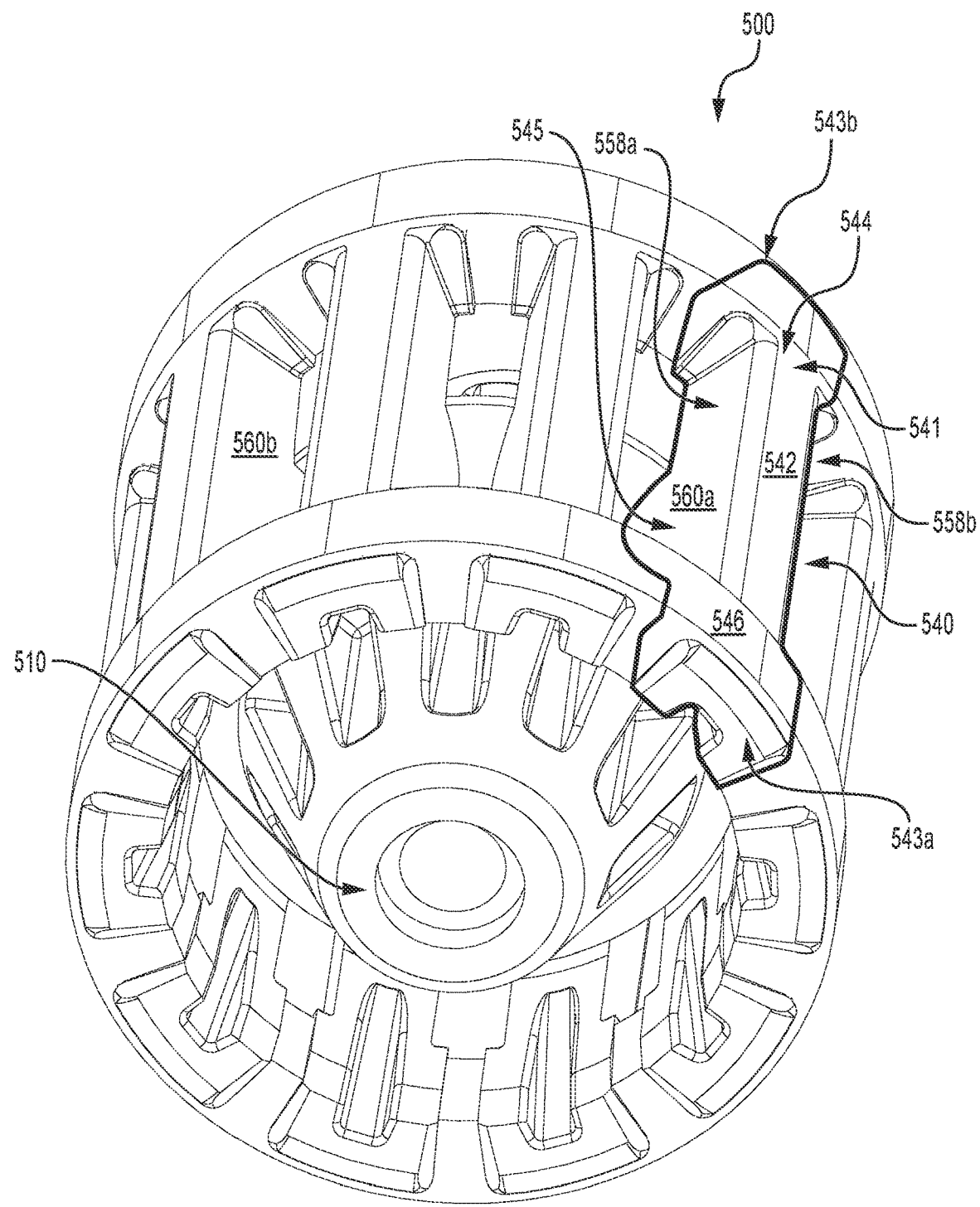
FIG. 16 is a perspective view taken from a top, front side of the deformable wheel of FIG. 13.

As best seen in FIGS. 14 and 16, the deformable wheel 500 comprises rim portions 540. The rim portions 540 are connected to the resilient member 520 such that the rim portions 540 are circumferentially spaced. In some embodiments, the rim portions 540 could be very close to one another, so long as the rim portions 540 are free to move with respect to one another. The rim portions 540 may be connected to the resilient member 540 by overmolding, gluing, fastening, interlocking, and/or mechanically interlocking.

As the rim portions 540 are identical, only one will be described in detail herewith. The rim portion 540 spans a majority of a width of the endless track 90. In some embodiments, the rim portion 540 could span more than half of the width of the endless track 90. In some embodiments, the rim portion 540 could span about 70% of a width of the endless track 90. In other embodiments, the rim portion 540 could span 60% of a width of the endless track 90. In yet other embodiments, the rim portion 540 could span 50% of a width of the endless track 90.

The rim portion 540 has an outer surface 541 that is configured to engage with the inner surface 92 of the endless track 90. The rim portion 540 has an intermediate segment 542 that extends generally laterally from the longitudinal center plane 502 to left and right sides of the rim portion 540 between the ends 543 a, 543 b of the rim portions 540. The intermediate segment 542 comprises a central protrusion 545 which connects the rim portion 540 to the resilient member 520 to act, at least indirectly, as a pivot relative to the central groove 518 of the hub 510. The rim portion 540 further has a left longitudinal segment 544 connected to the intermediate segment 542 at the left side and a right longitudinal segment 546 connected to the intermediate segment 542 at the right side. The left and right longitudinal segments 544, 546 extend longitudinally, both forwardly and rearwardly, relative to the intermediate segment 542, such that the rim portion 540 defines a leading recess 558 a, and a trailing recess 558 b.

In some embodiments, the rim portion 540 also has a leading lug contacting portion 560a extending radially inwardly from and along a leading side of the rim portion 540 (i.e., within the leading recess 558a) and a trailing lug contacting portion 560b extending radially inwardly from and along a trailing side of the rim portion 540 (i.e., within the trailing recess 558b). The leading recess 558a of one of the rim portions 540 and the trailing recess 558b of an adjacent rim portion 540 are configured to receive one of the lugs 96 therein. The leading and trailing lug contacting portions 560a, 560b can help to guide and to synchronize the endless track 90 to avoid "de-tracking" and/or "tooth-skipping". It is understood that other shapes and configurations are contemplated as well.

The rim portions 540 is made from a low-friction material. In some embodiments, the low friction material could be polyethylene such as high molecular weight polyethylene or ultra-high molecular weight polyethylene. In other embodiments, the rim portion 540 could be made from a metallic material, or another suitable material. It is further contemplated that in some embodiments, the rim portion 540 could have a protective layer disposed on the outer surface 541. The protective layer could be configured to reduce friction, while extending life of the rim portion 540.

As best seen in FIGS. 13 and 14, the deformable wheel 500 further comprises resilient rings 562 a, 562 b. Resilient ring 562 a connects the first ends 543 a of the rim portions 540, whereas resilient ring 562 b connects the second ends 543 b of the rim portions 540. Resilient rings 562 a, 562 b allow to distribute the loads and displacements of a given rim portion to the rim portions which are adjacent to it. In other words, unlike the deformable wheel 400, the resilient rings 562 a, 562 b of the deformable wheel 500 allow cooperation of adjacent rim portions by distributing at least part of the energy and the displacement induced by the crossing of an obstacle between several rim portions, which results into better ride quality, better durability of the track system, etc. The resilient rings 562 a, 562 b also contribute to stiffening the deformable wheel 500. The resilient rings 562 a, 562 b have protrusions 565 extending radially therefrom and filling the space between the ends 543 a, 543 b of the rim portions 540 in order to control the yaw (left-right) deformation of the rim portions 540 relative to the hub 510. The resilient rings 562 a, 562 b can be overmolded at the rim portions 540, glued, fastened, interlocked, mechanically interlocked, etc.

The rim portions 540 have an initial position, at rest, where the rim portions 540 are generally centered across the longitudinal center plane 502. The rim portions 540 are moveable about the longitudinal center plane 502 as well as about the hub 510, and are biased to return toward their initial position. The rim portions 540 are moveable along and/or across to the longitudinal center plane 502. In some embodiments, the movement of each one of the rim portions 540 could be a pivotal motion about a pivot axis defined by the central protrusions 545 of the rim portions 540 relative to the resilient member 520 and the central groove 518 of the hub 510.

In some implementations of these embodiments, the deformable wheel 500 is a support wheel. In these implementations, movement of the rim portions 540 relative to the hub 510 acts as a resilient lateral pivot of a support wheel.

Thus, deformable wheel 500 may in some instances replace a support wheel assembly comprising two laterally spaced support wheels. It is understood that the pivotal motion of the rim portions 540 relative to the hub 510—and ultimately relative to the axle to which the hub 510 in mounted—is advantageously equivalent to a pivotal motion of a pair of laterally spaced support wheels about a longitudinal axis in some cases.

In some other implementations of these embodiments, the deformable wheel 500 is an idler wheel. It is understood that in embodiments where the rim portions 540 include leading and trailing lug contacting portions 560a, 560b, this can help to guide and to synchronize the endless track 90 to avoid "de-tracking" and/or "tooth-skipping" and that more than a regular idler wheel in some cases.

In some other implementations of these embodiments, the deformable wheel 500 is a sprocket wheel. It is understood that in embodiments where the rim portions 540 include leading and trailing lug contacting portions 560a, 560b, these leading and trailing lug contacting portions 560a, 560b can be configured to drive the endless track 90 via the lugs 96.

In some further implementations, the deformable wheel 500 could combine the actions of an idler wheel and a sprocket wheel with the ability to compensate for deformation introduced into the endless track 90 upon movement of the rim portions 540.

In some further implementations, the deformable wheel 500 could combine the actions of an idler wheel and a support wheel.

In some further implementations, the deformable wheel 500 could combine the actions of a support wheel, an idler wheel and a sprocket wheel.

For instance, and without being limited to, the deformable wheel can be particularly advantageous in a track system of oblong shape and configuration, where the deformable wheel 500 combines actions of a support wheel and at least one of an idler wheel and a sprocket wheel. In other words, the deformable wheel 500 can be in contact with the ground (replacing or acting as a pair of laterally spaced support wheels) while also at least guiding and synchronizing the endless track 90 (replacing or acting as an idler wheel) and/or driving the endless track 90 (replacing or acting as a sprocket wheel).

Materials and Manufacturing

The various components of the track system 50 are made of conventional materials (e.g., metals and metal alloys in most cases, such as steel) via conventional manufacturing processes (e.g., casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A deformable wheel comprising:
   a hub;
   at least one resilient member connected to the hub; and
   a plurality of circumferentially positioned rim portions connected to the at least one resilient member, each one of the plurality of rim portions being moveable relative to the hub about the at least one resilient member and about a virtual pivot point located away from the hub so that each one of the at least one resilient member is positioned between the hub and the virtual pivot point.

2. The deformable wheel of claim 1, wherein the deformable wheel has a first configuration, and the at least one resilient member is biased to return the deformable wheel toward the first configuration in response to deformation of the deformable wheel.

3. The deformable wheel of claim 1, wherein the hub defines an axis of rotation generally perpendicular to a longitudinal plane of the deformable wheel, and each one of the plurality of rim portions is moveable such that, in response to one of the plurality of rim portions being moved, a projection of the one of the plurality of rim portions becomes transversal to the axis of rotation.

4. The deformable wheel of claim 1, wherein the at least one resilient member is deformable about a longitudinal plane of the deformable wheel.

5. The deformable wheel of claim 1, wherein:
the hub has a first hub end portion, a second hub end portion and a central hub portion extending between the first and second hub end portions; and
the at least one resilient member surrounds the central hub portion and is disposed between the first and second hub end portions.

6. The deformable wheel of claim 1, wherein the at least one resilient member extends generally radially.

7. The deformable wheel of claim 1, wherein the at least one resilient member is connected to a radial surface of the hub.

8. The deformable wheel of claim 1, wherein each one of the plurality of rim portions is independent of other ones of the plurality of rim portions.

9. The deformable wheel of claim 1, wherein the plurality of rim portions is circumferentially spaced so as to receive at least one lug of an endless track between two adjacent rim portions.

10. The deformable wheel of claim 1, wherein each one of the plurality of rim portions can move relative to a longitudinal center plane of the deformable wheel by about 15 degrees.

11. The deformable wheel of claim 1, wherein at least some of the plurality of rim portions are in contact with an endless track of a track system, and in response to movement of the endless track relative to the wheel hub, at least one of the at least some of the plurality of rim portions moves relative to the wheel hub.

12. The deformable wheel of claim 1, wherein the deformable wheel is a support wheel, an idler wheel, or a sprocket wheel.

13. A track system comprising:
a frame;
a sprocket wheel assembly rotationally connected to the frame;
at least one idler wheel assembly rotationally connected to the frame;
at least one support wheel assembly rotationally connected to the frame; and
an elastomeric endless track surrounding the frame, the sprocket wheel assembly, the at least one idler wheel assembly and the at least one support wheel assembly,
wherein at least one of the sprocket wheel, the at least one idler wheel assembly and the at least one support wheel assembly includes a deformable wheel according to claim 1.

14. The track system of claim 13, wherein each one of the plurality of rim portions spans at least 75% of a width of the endless track.

15. The track system of claim 13, wherein when the track system is operatively connected to a driving axle of a vehicle at a given camber angle, the movement of the rim portions of the deformable wheel relative to the hub compensates, at least partially, for the given camber angle.

16. A deformable wheel comprising:
a hub; and
a plurality of rim portions connected to the hub, the plurality of rim portions being positioned circumferentially around the hub, and each one of the plurality of rim portions:
defines a first lateral side and a second lateral side, and
includes at least one resilient member extending on one of the first and second lateral sides, the at least one resilient member being configured to resiliently deform; each one of the plurality of rim portions being moveable relative to the hub about the at least one resilient member and about a virtual pivot point located away from the hub so that each one of the at least one resilient member is positioned between the hub and the virtual pivot point.

17. The deformable wheel of claim 16, wherein the at least one resilient member is biased to return toward an initial position in response to being deformed.

* * * * *